(12) United States Patent
Thompson

(10) Patent No.: US 11,179,969 B2
(45) Date of Patent: Nov. 23, 2021

(54) WHEEL COMPRISING A NON-PNEUMATIC TIRE

(71) Applicant: CAMSO INC., Magog (CA)

(72) Inventor: Ronald H. Thompson, Greenville, SC (US)

(73) Assignee: CAMSO INC., Magog (CA)

( * ) Notice: Subject to any disclaimer, the term of this patent is extended or adjusted under 35 U.S.C. 154(b) by 0 days.

(21) Appl. No.: 16/623,109

(22) PCT Filed: May 4, 2018

(86) PCT No.: PCT/CA2018/050534
§ 371 (c)(1),
(2) Date: Dec. 16, 2019

(87) PCT Pub. No.: WO2018/227276
PCT Pub. Date: Dec. 20, 2018

(65) Prior Publication Data
US 2020/0114687 A1    Apr. 16, 2020

Related U.S. Application Data

(60) Provisional application No. 62/520,227, filed on Jun. 15, 2017.

(51) Int. Cl.
*B60C 7/18*      (2006.01)
*B60C 1/00*      (2006.01)
(Continued)

(52) U.S. Cl.
CPC .............. *B60C 7/18* (2013.01); *B60C 1/0016* (2013.01); *B60C 7/14* (2013.01); *B60C 11/0008* (2013.01);
(Continued)

(58) Field of Classification Search
CPC .... B60C 7/00; B60C 7/08; B60C 7/10; B60C 7/14; B60C 2007/107; B60C 2007/146;
(Continued)

(56) References Cited

U.S. PATENT DOCUMENTS 4,164,251 A    8/1979    Chung
4,226,273 A    10/1980   Long et al.
(Continued)

FOREIGN PATENT DOCUMENTS

CA    2458002    8/2010
CA    2651523    2/2012
(Continued)

OTHER PUBLICATIONS

European Search Report dated Aug. 16, 2018 in connection with European Serial No. 16747290.1, 8 pages.
(Continued)

*Primary Examiner* — Jason R Bellinger

(57) ABSTRACT

A wheel for a vehicle (e.g., a construction vehicle, an all-terrain vehicle, or other off-road vehicle) or other device, in which the wheel includes a non-pneumatic tire that may be designed to enhance its use and performance, including to be able to be used longer and/or in more challenging conditions, such as by being more resistant to cracking or other damage which could lead to premature failure (e.g., due to manufacturing artifacts and/or rocks and other hazards that can cut, chip, or tear during use). The non-pneumatic tire includes an annular beam configured to deflect at a contact patch of the non-pneumatic tire and an annular support extending radially inwardly from the annular beam and configured to support loading by tension. An elastomeric material of at least one of the annular beam and
(Continued)

the annular support may have selected properties, including greater crack propagation resistance when subject to tensile stress.

26 Claims, 17 Drawing Sheets

(51) Int. Cl.
*B60C 7/14* (2006.01)
*B60C 11/00* (2006.01)
*B60C 7/10* (2006.01)

(52) U.S. Cl.
CPC .............. *B60C 2001/0091* (2013.01); *B60C 2007/107* (2013.01); *B60C 2007/146* (2013.01); *B60C 2011/0025* (2013.01); *B60C 2200/14* (2013.01)

(58) Field of Classification Search
CPC .... B60C 7/18; B60B 9/00; B60B 9/10; B60B 9/02; B60B 9/04
See application file for complete search history.

(56) References Cited

U.S. PATENT DOCUMENTS

| | | | |
|---|---|---|---|
| 4,235,270 A | 11/1980 | Kahaner et al. | |
| 4,784,201 A | 11/1988 | Palinkas et al. | |
| 4,832,098 A | 5/1989 | Palinkas et al. | |
| 4,921,029 A | 5/1990 | Palinkas et al. | |
| 4,934,425 A | 6/1990 | Gajewski et al. | |
| 4,945,962 A | 8/1990 | Pajtas | |
| 5,023,040 A | 6/1991 | Gajewski et al. | |
| 5,042,544 A | 8/1991 | Dehasse | |
| 5,139,066 A | 8/1992 | Jarman | |
| 5,223,599 A | 6/1993 | Gajewski | |
| 5,265,659 A | 11/1993 | Pajtas et al. | |
| 5,343,916 A | 9/1994 | Duddey et al. | |
| 5,460,213 A | 10/1995 | Pajtas | |
| 5,676,900 A | 10/1997 | Pajtas | |
| 6,068,353 A | 5/2000 | Juncker et al. | |
| 6,615,885 B1 | 9/2003 | Ohm | |
| 6,617,383 B2 | 9/2003 | Msahiro | |
| 6,681,822 B2 | 1/2004 | Adams et al. | |
| 6,769,746 B2 | 8/2004 | Rodgers et al. | |
| 7,013,939 B2 | 3/2006 | Rhyne et al. | |
| 7,066,225 B2 | 6/2006 | Rhyne et al. | |
| 7,201,194 B2 | 4/2007 | Rhyne et al. | |
| 7,418,988 B2 | 9/2008 | Cron et al. | |
| 7,473,472 B2 | 1/2009 | Chevaux et al. | |
| 7,650,919 B2 | 1/2010 | Rhyne et al. | |
| 7,950,428 B2 | 5/2011 | Hanada et al. | |
| 8,056,593 B2 | 11/2011 | Palinkas et al. | |
| 8,061,398 B2 | 11/2011 | Palinkas et al. | |
| 8,104,524 B2 | 1/2012 | Manesh et al. | |
| 8,109,308 B2 | 2/2012 | Manesh et al. | |
| 8,113,253 B2 | 2/2012 | Arakawa et al. | |
| 8,176,957 B2 | 5/2012 | Manesh et al. | |
| 8,207,286 B2 * | 6/2012 | Rukavina | C08G 18/12 528/85 |
| 8,276,628 B2 | 10/2012 | Hanada et al. | |
| 8,491,981 B2 | 7/2013 | Delfino et al. | |
| 8,517,068 B2 | 8/2013 | Delfino et al. | |
| 8,544,515 B2 | 10/2013 | Ma et al. | |
| 8,555,941 B2 | 10/2013 | Chadwick et al. | |
| 8,567,461 B2 | 10/2013 | Williams et al. | |
| 8,578,607 B2 | 11/2013 | Kim | |
| 8,646,497 B2 | 2/2014 | Cron | |
| 8,688,421 B2 | 4/2014 | Summers et al. | |
| D711,815 S | 8/2014 | Abe et al. | |
| 8,813,797 B2 | 8/2014 | Anderson et al. | |
| 8,851,131 B2 | 10/2014 | Luchini et al. | |
| 8,883,283 B2 | 11/2014 | Delfino et al. | |
| 8,919,404 B2 | 12/2014 | Schweitzer et al. | |
| 8,944,125 B2 | 2/2015 | Manesh et al. | |
| 8,960,248 B2 | 2/2015 | Cron et al. | |
| 8,962,120 B2 | 2/2015 | Delfino et al. | |
| 8,991,455 B2 | 3/2015 | Cron | |
| 8,999,480 B2 | 4/2015 | Summers et al. | |
| 9,004,127 B2 | 4/2015 | Manesh et al. | |
| 9,120,351 B2 | 9/2015 | Mun et al. | |
| 9,139,045 B2 | 9/2015 | Palinkas et al. | |
| 9,180,737 B2 | 11/2015 | Amstutz et al. | |
| 9,248,697 B2 | 2/2016 | Iwamura | |
| 9,254,716 B2 | 2/2016 | Cron et al. | |
| 9,290,045 B2 | 3/2016 | Cron et al. | |
| 9,333,799 B2 | 5/2016 | Choi et al. | |
| 9,346,499 B2 | 5/2016 | Rudakevych et al. | |
| 9,387,726 B2 | 7/2016 | Choi et al. | |
| D763,785 S | 8/2016 | Abe et al. | |
| 9,463,603 B2 | 10/2016 | Chadwick et al. | |
| 9,475,244 B2 | 10/2016 | Williams et al. | |
| 9,475,379 B2 | 10/2016 | Imamiya et al. | |
| 9,487,046 B2 | 11/2016 | Amstutz et al. | |
| 9,493,045 B2 | 11/2016 | Cron et al. | |
| 9,511,625 B2 | 12/2016 | Nishida et al. | |
| 9,511,631 B2 | 12/2016 | Fudemoto et al. | |
| 9,511,632 B2 | 12/2016 | Fudemoto et al. | |
| 9,550,393 B2 | 1/2017 | Abe et al. | |
| 9,573,422 B2 | 2/2017 | Gass et al. | |
| 9,616,703 B2 | 4/2017 | Nishida et al. | |
| 9,623,702 B2 | 4/2017 | Fudemoto et al. | |
| 9,662,939 B2 | 5/2017 | Manesh et al. | |
| 9,713,940 B2 | 7/2017 | Nishida et al. | |
| 9,751,270 B2 | 9/2017 | Thompson | |
| 10,166,732 B2 | 1/2019 | Thompson et al. | |
| 2003/0201043 A1 | 10/2003 | Adams et al. | |
| 2004/0012246 A1 | 1/2004 | Rhyne et al. | |
| 2006/0113016 A1 | 6/2006 | Cron et al. | |
| 2007/0119531 A1 | 5/2007 | Steinke et al. | |
| 2007/0267116 A1 | 11/2007 | Rhyne et al. | |
| 2008/0029215 A1 | 2/2008 | Delfino et al. | |
| 2009/0107596 A1 | 4/2009 | Palinkas et al. | |
| 2009/0211677 A1 | 8/2009 | Palinkas et al. | |
| 2009/0211681 A1 | 8/2009 | Palinkas et al. | |
| 2009/0250149 A1 | 10/2009 | Sebe | |
| 2009/0294000 A1 | 12/2009 | Cron et al. | |
| 2010/0132858 A1 | 6/2010 | Arakawa et al. | |
| 2010/0132865 A1 | 6/2010 | Iwase et al. | |
| 2010/0193097 A1 | 8/2010 | McNier et al. | |
| 2010/0200131 A1 | 8/2010 | Iwase et al. | |
| 2011/0017377 A1 | 1/2011 | Albert et al. | |
| 2011/0079336 A1 | 4/2011 | Thenault et al. | |
| 2011/0104428 A1 | 5/2011 | Delfino et al. | |
| 2011/0240193 A1 | 10/2011 | Matsuda et al. | |
| 2011/0260525 A1 | 10/2011 | Delfino et al. | |
| 2012/0038206 A1 | 2/2012 | Chadwick et al. | |
| 2012/0038207 A1 | 2/2012 | Williams et al. | |
| 2012/0193004 A1 | 8/2012 | Anderson et al. | |
| 2012/0216932 A1 | 8/2012 | Cron et al. | |
| 2012/0234444 A1 | 9/2012 | Palinkas et al. | |
| 2012/0234445 A1 | 9/2012 | Manesh et al. | |
| 2012/0247635 A1 | 10/2012 | Manesh et al. | |
| 2013/0048174 A1 | 2/2013 | Cron | |
| 2013/0150516 A1 | 6/2013 | Lettow | |
| 2013/0167990 A1 | 7/2013 | Bae | |
| 2013/0233458 A1 | 9/2013 | Meraldi et al. | |
| 2013/0240097 A1 | 9/2013 | Cron et al. | |
| 2013/0278045 A1 | 10/2013 | Dotson et al. | |
| 2013/0284329 A1 | 10/2013 | Wilson et al. | |
| 2014/0062168 A1 | 3/2014 | Martin et al. | |
| 2014/0062169 A1 | 3/2014 | Martin et al. | |
| 2014/0062170 A1 | 3/2014 | Martin et al. | |
| 2014/0062171 A1 | 3/2014 | Martin et al. | |
| 2014/0062172 A1 | 3/2014 | Martin et al. | |
| 2014/0083581 A1 | 3/2014 | Schaedler et al. | |
| 2014/0159280 A1 | 6/2014 | Martin et al. | |
| 2014/0191564 A1 | 7/2014 | Gebeau | |
| 2014/0191565 A1 | 7/2014 | Gebeau | |
| 2014/0205836 A1 | 7/2014 | Hidrot et al. | |
| 2014/0238561 A1 | 8/2014 | Choi et al. | |
| 2014/0251518 A1 | 9/2014 | Abe et al. | |
| 2014/0326374 A1 | 11/2014 | Cron et al. | |

(56) References Cited

U.S. PATENT DOCUMENTS

| | | |
|---|---|---|
| 2014/0367007 A1 | 12/2014 | Thompson |
| 2015/0034222 A1 | 2/2015 | Martin et al. |
| 2015/0034225 A1 | 2/2015 | Martin |
| 2015/0096654 A1 | 4/2015 | Sandstrom et al. |
| 2015/0122385 A1 | 5/2015 | Cron et al. |
| 2015/0174953 A1 | 6/2015 | Cron et al. |
| 2015/0246577 A1 | 9/2015 | Fudemoto et al. |
| 2015/0273945 A1 | 10/2015 | Fudemoto et al. |
| 2015/0273946 A1 | 10/2015 | Abe et al. |
| 2015/0343840 A1 | 12/2015 | Kinney et al. |
| 2015/0343845 A1 | 12/2015 | Kinney et al. |
| 2016/0016426 A1 | 1/2016 | Endicott |
| 2016/0096400 A1 | 4/2016 | Nomura et al. |
| 2016/0107402 A1 | 4/2016 | Cron et al. |
| 2016/0121656 A1 | 5/2016 | Sugiya et al. |
| 2016/0159152 A1 | 6/2016 | Delfino et al. |
| 2016/0167434 A1 | 6/2016 | Nishida et al. |
| 2016/0193876 A1 | 7/2016 | Kyo et al. |
| 2016/0200144 A1 | 7/2016 | Iwamura et al. |
| 2016/0214435 A1 | 7/2016 | Schaedler |
| 2016/0236514 A1 | 8/2016 | Abe |
| 2016/0250893 A1 | 9/2016 | Shoji et al. |
| 2016/0257170 A1 | 9/2016 | Sugiya et al. |
| 2016/0272006 A1 | 9/2016 | Abe |
| 2016/0280005 A1 | 9/2016 | Cron et al. |
| 2016/0288569 A1 | 10/2016 | Parfondry et al. |
| 2016/0297244 A1 | 10/2016 | Abe |
| 2016/0311479 A1 | 10/2016 | Rudakevych |
| 2016/0312014 A1 | 10/2016 | Lemerle et al. |
| 2016/0318342 A1 | 11/2016 | Delfino |
| 2016/0319111 A1 | 11/2016 | Chouvel et al. |
| 2017/0008341 A1 | 1/2017 | Martin |
| 2017/0008342 A1 | 1/2017 | Martin et al. |
| 2017/0015134 A1 | 1/2017 | Ma |
| 2017/0015141 A1 | 1/2017 | Shoji et al. |
| 2017/0057288 A1 | 3/2017 | Sugiya et al. |
| 2017/0057289 A1 | 3/2017 | Pratt |
| 2017/0057294 A1 | 3/2017 | Iwamura et al. |
| 2017/0072746 A1 | 3/2017 | Iwamura et al. |
| 2017/0080756 A1 | 3/2017 | Van Riper et al. |
| 2017/0096032 A1 | 4/2017 | Iwamura et al. |
| 2017/0106699 A1 | 4/2017 | Iwamura et al. |
| 2017/0113484 A1 | 4/2017 | Iwamura et al. |
| 2017/0113488 A1 | 4/2017 | Iwamura et al. |
| 2017/0113490 A1 | 4/2017 | Iwamura et al. |
| 2017/0113491 A1 | 4/2017 | Iwamura et al. |
| 2017/0120671 A1 | 5/2017 | Miles et al. |
| 2017/0120680 A1 | 5/2017 | Takahashi et al. |
| 2017/0120681 A1 | 5/2017 | Toyosawa |
| 2017/0129285 A1 | 5/2017 | Toyosawa |
| 2017/0136814 A1 | 5/2017 | Abe et al. |
| 2017/0157983 A1 | 6/2017 | Siegel |
| 2017/0157984 A1 | 6/2017 | Van Riper et al. |
| 2017/0174005 A1 | 6/2017 | Van Riper et al. |
| 2017/0197467 A1 | 7/2017 | Iwamura et al. |
| 2017/0232787 A1 | 8/2017 | Hasegawa et al. |
| 2017/0253084 A1 | 9/2017 | Takahashi et al. |
| 2017/0291453 A1 | 10/2017 | Sugiya et al. |
| 2017/0297371 A1 | 10/2017 | Sportelli |
| 2017/0297372 A1 | 10/2017 | Talbot et al. |
| 2017/0297373 A1 | 10/2017 | Sportelli et al. |
| 2017/0297374 A1 | 10/2017 | Sportelli |
| 2017/0305192 A1 | 10/2017 | Yokoyama |
| 2017/0305195 A1 | 10/2017 | Takahashi et al. |
| 2017/0334245 A1 | 11/2017 | Laskowitz |
| 2017/0368775 A1 | 12/2017 | Thompson |
| 2018/0001699 A1 | 1/2018 | Shoji |
| 2018/0029422 A1 | 1/2018 | Thompson |
| 2019/0111645 A1 | 4/2019 | Thompson |
| 2020/0009916 A1 | 1/2020 | Thompson et al. |

FOREIGN PATENT DOCUMENTS

| | | |
|---|---|---|
| CA | 2915483 | 12/2014 |
| CA | 2976055 | 8/2016 |
| CA | 3006801 | 6/2017 |
| CA | 3008828 | 6/2017 |
| CA | 3008846 | 6/2017 |
| EP | 0334522 | 9/1989 |
| EP | 0353006 | 1/1990 |
| EP | 0502353 | 9/1992 |
| EP | 1378377 | 1/2004 |
| JP | 3923073 | 5/2007 |
| JP | 2011-219009 | 11/2011 |
| NL | 2002956 | 12/2010 |
| WO | 1996005917 | 2/1996 |
| WO | 2008045098 | 4/2008 |
| WO | 2008118983 | 10/2008 |
| WO | 2009005945 | 1/2009 |
| WO | 2009005946 | 1/2009 |
| WO | 2009035561 | 11/2009 |
| WO | 2011011419 | 1/2011 |
| WO | 2013095499 | 6/2013 |
| WO | 2014036415 | 3/2014 |
| WO | 2014172095 | 10/2014 |
| WO | 2014201368 | 12/2014 |
| WO | 2015017100 | 2/2015 |
| WO | 2015017133 | 2/2015 |
| WO | 2015052987 | 4/2015 |
| WO | 2015072222 | 5/2015 |
| WO | 2015112417 | 7/2015 |
| WO | 2015141579 | 9/2015 |
| WO | 2015165777 | 11/2015 |
| WO | 2015175002 | 11/2015 |
| WO | 2015175003 | 11/2015 |
| WO | 2015187394 | 12/2015 |
| WO | 2015194087 | 12/2015 |
| WO | 2015194088 | 12/2015 |
| WO | 2015194277 | 12/2015 |
| WO | 2015198387 | 12/2015 |
| WO | 2015198637 | 12/2015 |
| WO | 2016021300 | 2/2016 |
| WO | 2016056444 | 4/2016 |
| WO | 2016072181 | 5/2016 |
| WO | 2016084512 | 6/2016 |
| WO | 2016089480 | 6/2016 |
| WO | 2016098477 | 6/2016 |
| WO | 2016100004 | 6/2016 |
| WO | 2016105654 | 6/2016 |
| WO | 2016109557 | 7/2016 |
| WO | 2016109648 | 7/2016 |
| WO | 2016109702 | 7/2016 |
| WO | 2016114167 | 7/2016 |
| WO | 2016114168 | 7/2016 |
| WO | 2016123180 | 8/2016 |
| WO | 2016126983 | 8/2016 |
| WO | 2016148295 | 9/2016 |
| WO | 2016152887 | 9/2016 |
| WO | 2017039604 | 3/2017 |
| WO | 2017040390 | 3/2017 |
| WO | 2017052010 | 3/2017 |
| WO | 2017061405 | 4/2017 |
| WO | 2017072560 | 5/2017 |
| WO | 2017072562 | 5/2017 |
| WO | 2017086993 | 5/2017 |
| WO | 2017087853 | 5/2017 |
| WO | 2017106704 | 6/2017 |
| WO | 2017106723 | 6/2017 |
| WO | 2017110769 | 6/2017 |
| WO | 2017111944 | 6/2017 |
| WO | 2017112130 | 6/2017 |
| WO | 2017116384 | 7/2017 |
| WO | 2017116385 | 7/2017 |
| WO | 2017116386 | 7/2017 |
| WO | 2017116389 | 7/2017 |
| WO | 2017116390 | 7/2017 |
| WO | 2017116454 | 7/2017 |
| WO | 2017116463 | 7/2017 |
| WO | 2017116472 | 7/2017 |
| WO | 2017116481 | 7/2017 |
| WO | 2017116556 | 7/2017 |
| WO | 2017116557 | 7/2017 |
| WO | 2017116561 | 7/2017 |
| WO | 2017116565 | 7/2017 |

(56) References Cited

FOREIGN PATENT DOCUMENTS

| WO | 2017116804 | 7/2017 |
|----|------------|--------|
| WO | 2017117587 | 7/2017 |
| WO | 2017117598 | 7/2017 |
| WO | 2017117599 | 7/2017 |
| WO | 2017117605 | 7/2017 |
| WO | 2017117606 | 7/2017 |
| WO | 2017159899 | 9/2017 |
| WO | 2017200645 | 11/2017 |
| WO | 2018111339 | 6/2018 |
| WO | 2018112650 | 6/2018 |
| WO | 2018227276 | 12/2018 |
| WO | 2019119155 | 6/2019 |
| WO | 2019227205 | 12/2019 |
| WO | 2020051715 | 3/2020 |
| WO | 2020082186 | 4/2020 |

OTHER PUBLICATIONS

European Search Report dated May 24, 2019 in connection with European Patent Application No. 16876817.4, 18 pages.
Examiner's Report dated Nov. 13, 2018 in connection with European Patent Application No. 14811289.9, 15 pages.
International Preliminary Report on Patentability issued in connection with International Patent Application No. PCT/US2014/042327 dated Dec. 23, 2015, 6 pages.
International Preliminary Report on Patentability issued in International Patent Application No. PCT/US2016/016630 dated Mar. 2, 2017, 39 pages.
International Preliminary Report on Patentability dated Mar. 7, 2019 in connection with International PCT Patent Application No. PCT/US2017/035008, 7 pages.
International Search Report dated Oct. 30, 2017, in connection with International PCT application No. PCT/2017/035008, 4 pages.
International Search Report dated Apr. 13, 2016 in connection with PCT application No. PCT/US2016/016630, 2 pages.
International Search Report dated Jul. 25, 2018 in connection with PCT Patent Application No. PCT/CA2018/050534, 3 pages.
International Search Report dated Feb. 19, 2018 in connection with PCT Patent application No. PCT/CA2017/051577, 7 pages.
International Search Report dated Mar. 28, 2019 in connection with International PCT application No. PCT/CA2018/051658, 3 pages.
International Search Report dated Nov. 3, 2014 in connection with International Application No. PCT/US2014/042327.
Summons to attend oral proceedings pursuant to Rule 115(1) EPC issued on Jun. 19, 2019 in connection with European Patent Application No. 14811289.9, 14 pages.
Supplementary European Search Report dated Feb. 1, 2017, in connection with European Patent Application No. 14811289.9, 13 pages.
International Search Report and Written Opinion dated Aug. 20, 2019 in connection with International PCT application No. PCT/CA2019/050722, 11 pages.
Written Opinion dated Nov. 3, 2014 in connection with International PCT Application No. PCT/US2014/042327, 5 pages.
Written Opinion dated Oct. 30, 2017, on connection with International PCT Application No. PCT/2017/035008, 15 pages.
Written Opinion dated Apr. 13, 2016 in connection with PCT application PCT/US2016/016630, 7 pages.
Written Opinion dated Dec. 20, 2018 in connection with PCT Patent Application No. PCT/CA2018/050534, 4 pages.
Written Opinion dated Feb. 19, 2018 in connection with PCT Patent Application No. PCT/CA2017/051577, 7 pages.
Written Opinion dated Mar. 28, 2019 in connection with International PCT application No. PCT/CA2018/051658, 3 pages.
International Search Report dated Dec. 10, 2019 in connection with International PCT application No. PCT/CA2019/051303, 6 pages.
Written Opinion dated Dec. 10, 2019 in connection with International PCT application No. PCT/CA2019/051303, 6 pages.
Communication pursuant to Article 94(3) dated Nov. 11, 2019 by the Examining Division (EPO) in connection with European Patent Application No. 16747290.1, 11 pages.
International Search Report dated Jan. 27, 2020, in connection with International PCT application No. PCT/CA2019/051514, 4 pages.
Written Opinion dated Jan. 27, 2020, in connection with International PCT application No. PCT/CA2019/051514, 7 pages.
Muvdi, B.B. et al. "Shear and Bending Moment in Beams", Engineering Mechanics of Materials; Macmillan Publishing Co., Inc.; New York, NY; pp. 23-31.
Muvdi, B.B. et al. "Deflections of Beams", Engineering Mechanics of Materials; Macmillan Publishing Co., Inc.; New York, NY; pp. 266-333.
Rhyne, T. B. and Cron, S. M., "Development of a Non-Pneumatic Wheel," Tire Science and Technology, TSTCA, vol. 34, No. 3, Jul.-Sep. 2006, pp. 150-169.
Timothy B. Rhyne, Steven M. Cron, "Development of a Non-Pneumatic Wheel," submitted for presentation at the 2005 Tire Society meeting, and for consideration for publication in the journal Tire science and Technology, 34 pages.
Taheri, Saied, "Center for Tire Research (CenTiRe)," presentation at Virginia Tech on Novembers, 2017 (Client has emphasized slide 34).
Michelin North America, "The Michelin X Tweel Turf", Targeted News Services, Apr. 3, 2015, 2 pages.
Tweel et al., "The Airless Radial Tire ™ & wheel assembly. Designed for use on skid steer loaders, v no maintenance v no compromise v no downtime Now available in two models : All Tterrain for use on a wide range of surfaces, and Hard Surface for maximum tread life on pavement"., Jun. 16, 2015, 2 pages.
Powell, Robert, "Relationships between lane change performance and open-loop handling metrics", Clemson University Tigerprints, Jan. 1, 2009, 182 pages.
Anonymous, "Michelin's Tweel Airless" Tires Available for Skid Steers, Mowers-Real Agriculture, Jun. 17, 2015, 2 pages.
A.M. Aboul-Yazid et al., "Effet of spokes structures on characteristics performance of non-pneumatic tires", International Journal of Automotive and Mechanical Engineering, vol. 11, Jun. 30, 2015, 12 pages.
C.W. Lim, et al.—"Timoshenko curved beam bending solution in terms of Euler-Bernoulli solutions" Archive of Applied Mechanics 67 (1997)—179-190 Springer—Verlag 1997.
Amir Gasmi et al. "Closed form of a shear deformable, extensional ring in contact between two rigid surfaces" International Journal of Solids and Structures 48 (2011) 843-853.
Amir Gasmi et al. "Development of a two-dimensional model of a compliant non pneumatic tire" International Journal of Solids and Structures 49 (2012) 1723-1740.
Decision to Refuse a European Patent Application, dated Jan. 27, 2020, in connection with European Patent Application 1411289.9, 13 pages.
Jaehyung Ju et al. "Rolling Resistance of a Nonpneumatic Tire Having a Porous Elastomer Composite Shear Band" Tire Science and Technology 41(3) (Jul. 2013) 154-173.

* cited by examiner

WHEEL COMPRISING A NON-PNEUMATIC TIRE

CROSS-REFERENCE TO RELATED APPLICATION

This application is a national stage entry under 35 U.S.C. 371 of International Patent Application PCT/CA2018/050534 filed on May 4, 2018, which claims priority from U.S. Provisional Patent Application 62/520,227 filed on Jun. 15, 2017 and incorporated by reference herein.

FIELD

This disclosure relates to non-pneumatic tires (NPTs) for vehicles (e.g., industrial vehicles such as construction vehicles; agricultural vehicles; all-terrain vehicles; automobiles and other road vehicles; etc.) or other devices, including to performance metrics and test methodologies for materials used to make NPTs.

BACKGROUND

Non-pneumatic tires (NPTs) have advantages over pneumatic tires because they cannot fail due to air pressure loss. However, NPTs may suffer in performance relative to pneumatic tires. For example, NPTs may often be less compliant or heavier or more expensive.

Historically, NPTs have functioned in compression, with contact patch forces transmitted via compression. An example is a so-called "solid" tire, such as those used in fork lift trucks. Improvements in compression-based NPTs usually involve creating a structure in the tire, such as holes or recesses, thereby adding compliance and removing weight. Examples of tires that embody such concepts notably include U.S. Pat. Nos. 4,921,029, 5,023,040, 8,056,593 and 5,223,599 among others.

NPTs that work primarily in tension have also been developed. U.S. Pat. Nos. 8,104,524, 6,769,465 and 7,013,939 disclose NPTs comprising a circumferentially reinforced band connected to a central hub via deformable connecting elements that function primarily in tension. Such tension-based NPTs hold promise for being able to function more similarly to pneumatic tires.

More recently, a tension-based NPT has been disclosed that may not comprise circumferential reinforcement. U.S. Pat. No. 9,751,270 discloses a NPT comprising an annular beam that may not comprise circumferential reinforcement. Instead, complex geometries are disclosed that enable a composite-like response to a structure that can be constructed from isotropic materials, including elastomers.

Reinforced elastomers, such as cord/rubber composites, may resist tension-induced crack propagation by virtue of presence of reinforcement. Mechanics of crack propagation indicate that cracks tend to grow in a direction perpendicular to an applied oscillating tensile force. An annular beam that bends in a contact area of an NPT with a surface develops tensile stresses in its circumferential direction. Thus, circumferential reinforcement may inhibit formation and propagation of cracks across the annular beam in its lateral direction. Prior disclosures of NPTs with reinforced circumferential bands show these types of cord/elastomer architectures.

Without reinforcement, an elastomeric material used to make a tension-based NPT should intrinsically be strongly resistant to crack propagation. The material should have a modulus of elasticity sufficient to carry the stress with appropriately small strains, yet simultaneously resist crack formation and propagation. Unlike NPTs that work in compression, such tension-based NPT may have thinner cross sections that work in tension, thereby further heightening importance of tension-induced crack propagation resistant materials.

Some compression-based NPT patent applications reference materials with a combination of favorable material properties and unique process-related characteristics. U.S. Patent Application Publication 2009/0110894 discloses cast polyurethane (PU) formulations having good flex fatigue, hysteresis, and abrasion performance, while giving process requirements that are favorable for large, thick-walled compression-based NPTs. The polyurethane formulation may enable a long pot life, with the curing reaction triggered only when a certain elevated temperature is reached.

Tension-based fatigue performance is not disclosed in U.S. Patent Application Publication 2009/0110894; rather, flex-based fatigue performance is disclosed as it may be sufficient for compression-based NPTs, but such flex-based fatigue performance is insufficient for tension-based NPTs, as discussed later herein. Modulus values disclosed in that publication are several (e.g., three to five) times less than values which may be necessary for tension-based NPTs. Processing characteristics are disclosed in that publication which are favorable for large parts with thick cross-sections used in compression-based NPTs. For such parts, it may be advantageous to fill the entire mold with a prepolymer that is already mixed with a blocked curative, then heat the entire, filled mold to a high temperature that triggers reaction. Relative to traditional cast PU tolylene diisocyanate (TDI) formulations, this process is more complicated. For a conventional PU, the exothermic curing reaction occurs due to mixing of the prepolymer and curative, regardless of mold temperature. Precise control and uniformity of mold temperature are not required. Furthermore, heating, cooling, then reheating a mold may hurt cycle time and increase costs.

Tension-based NPTs have relatively thin cross-sections, and have different processing needs than thick-walled compression-based NPTs. On its face, what makes U.S. Patent Application Publication 2009/0110894 interesting for thick compression-based NPTs would make it uninteresting for tension-based NPTs. Therefore, based on data contained in U.S. Patent Application Publication 2009/0110894, there would be no incentive to use materials from this class of elastomer in tension-based NPTs.

Still other prior disclosures address other elastomer material specifications related to fatigue. However, these specifications have addressed flex fatigue, not tension fatigue. For example, U.S. Pat. Nos. 4,921,029 and 5,023,040 specify a preferred level of Demattia Flex Fatigue (ASTM D813) or Texus Flex (ASTM-E3629-78). Cantilevered Beam Flex Test (ASTM D-671) is specified in U.S. Pat. No. 9,751,270. Still other documents specify values of hardness, hysteresis, and/or ultimate strain to failure. None of these tests address a fundamental crack propagation rate of a material in presence of an oscillating tensile stress.

For these and other reasons, there is a need for improvements in NPTs for vehicles and other devices, including in material performance and specifications.

SUMMARY

According to various aspects of this disclosure, there is provided a wheel for a vehicle (e.g., a construction vehicle, an all-terrain vehicle, or other off-road vehicle) or other device, in which the wheel comprises a non-pneumatic tire that may be designed to enhance its use and performance, including, for example, to be able to be used longer and/or in more challenging conditions, such as, for instance, by being more resistant to cracking or other damage which could lead to premature failure (e.g., due to manufacturing artifacts and/or rocks and other hazards that can cut, chip, or tear it during use). The non-pneumatic tire comprises an annular beam configured to deflect at a contact patch of the non-pneumatic tire and an annular support extending radially inwardly from the annular beam and configured to support loading by tension. An elastomeric material of at least one of the annular beam and the annular support may have selected properties, including greater crack propagation resistance when subject to tensile stress.

For example, according to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. A crack propagation rate of an elastomeric material of at least one of the annular beam and the annular support is no more than 1e-4 mm/cycle at a strain energy release rate of 3 N-mm/mm$^2$.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. A crack propagation rate of a thermoset elastomeric material of at least one of the annular beam and the annular support is no more than 1e-4 mm/cycle at a strain energy release rate of 3 N-mm/mm$^2$.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The annular beam is free of substantially inextensible reinforcement running in a circumferential direction of the non-pneumatic tire. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. A crack propagation rate of an elastomeric material of at least one of the annular beam and the annular support is no more than 1e-4 mm/cycle at a strain energy release rate of 3 N-mm/mm$^2$.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. The annular support comprises a plurality of spokes and each of the spokes extends freely from the annular beam towards a hub for at least a majority of a radial distance between the annular beam and the hub. A crack propagation rate of an elastomeric material of at least one of the annular beam and the annular support is no more than 1e-4 mm/cycle at a strain energy release rate of 3 N-mm/mm$^2$.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. The annular support comprises a plurality of spokes and each of the spokes has a free span length of at least 15% of an outer diameter of the non-pneumatic tire. A crack propagation rate of an elastomeric material of at least one of the annular beam and the annular support is no more than 1e-4 mm/cycle at a strain energy release rate of 3 N-mm/mm$^2$.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support extending radially inwardly from the annular beam and configured to deform such that, when the non-pneumatic tire is loaded, an upper portion of the annular support above an axis of rotation of the non-pneumatic tire is in tension. At least one of the annular beam and the annular support comprises a thermoset polyurethane elastomer made of a low-free MDI prepolymer reacted with a heat-activated diamine cure.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support extending radially inwardly from the annular beam and configured to deform such that, when the non-pneumatic tire is loaded, an upper portion of the annular support above an axis of rotation of the non-pneumatic tire is in tension. At least one of the annular beam and the annular support comprises a thermoplastic polyether-ester block copolymer elastomer.

According to an aspect of this disclosure, there is provided a non-pneumatic tire comprising an annular beam that is elastomeric and configured to deflect at a contact patch of the non-pneumatic tire as the non-pneumatic tire rolls on a ground surface. The non-pneumatic tire comprises an annular support that is elastomeric, extends radially inwardly from the annular beam and is configured to deform such that, when the non-pneumatic tire is loaded, an upper portion of the annular support above an axis of rotation of the non-pneumatic tire is in tension. The annular support comprises a plurality of spokes, and each of the spokes extends freely from the annular beam towards a hub. A free span length of each of the spokes is at least 15% of an outer diameter of the non-pneumatic tire. The non-pneumatic tire comprises a tread that is elastomeric and disposed radially outward from the annular beam. A crack propagation rate of an elastomeric material of at least one of the annular beam and the annular support is no more than 1e-4 mm/cycle at a strain energy release rate of 3 N-mm/mm². An elastomeric material of the tread is different from the elastomeric material of at least one of the annular beam and the annular support.

According to an aspect of this disclosure, there is provided a non-pneumatic tire comprising an annular beam configured to deflect at a contact patch of the non-pneumatic tire as the non-pneumatic tire rolls on a ground surface. The annular beam comprises an outer annular portion, an inner annular portion, and a shearing annular portion between the outer annular portion and the inner annular portion that are elastomeric and configured to cause the annular beam to deflect more by shearing than by bending at the contact patch of the non-pneumatic tire. The non-pneumatic tire comprises an annular support extending radially inwardly from the annular beam and configured to deform such that, when the non-pneumatic tire is loaded, an upper portion of the annular support above an axis of rotation of the non-pneumatic tire is in tension. A crack propagation rate of an elastomeric material of at least one of the annular beam and the annular support is no more than 1e-4 mm/cycle at a strain energy release rate of 3 N-mm/mm². A thickness $t_{BAND}$ of the inner annular portion in a radial direction of the non-pneumatic tire, a radius $R_{BEAM}$ of the annular beam, and a modulus of elasticity $E_{BAND}$ of an elastomeric material of the inner annular portion are related by $$1.8 \text{ MPa} < \frac{E_{BAND} t_{BAND}}{R_{BEAM}} < 7 \text{ MPa}.$$

In various aspects of this disclosure, including those mentioned above and others described throughout, one or both technological corridors of elastomer chemistry, namely thermoset and thermoplastic, may be used. While crack propagation performance and characterization are independent of elastomer chemistry, methods of improving crack propagation may differ between thermoset and thermoplastic elastomers. This disclosure discloses optimization methods and crack propagation performance for both technologies.

These and other aspects of this disclosure will now become apparent to those of ordinary skill in the art upon review of a description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for purposes of illustrating certain embodiments and are an aid for understanding. They are not intended to be and should not be limitative.

DETAILED DESCRIPTION OF EMBODIMENTS

Figure 1:
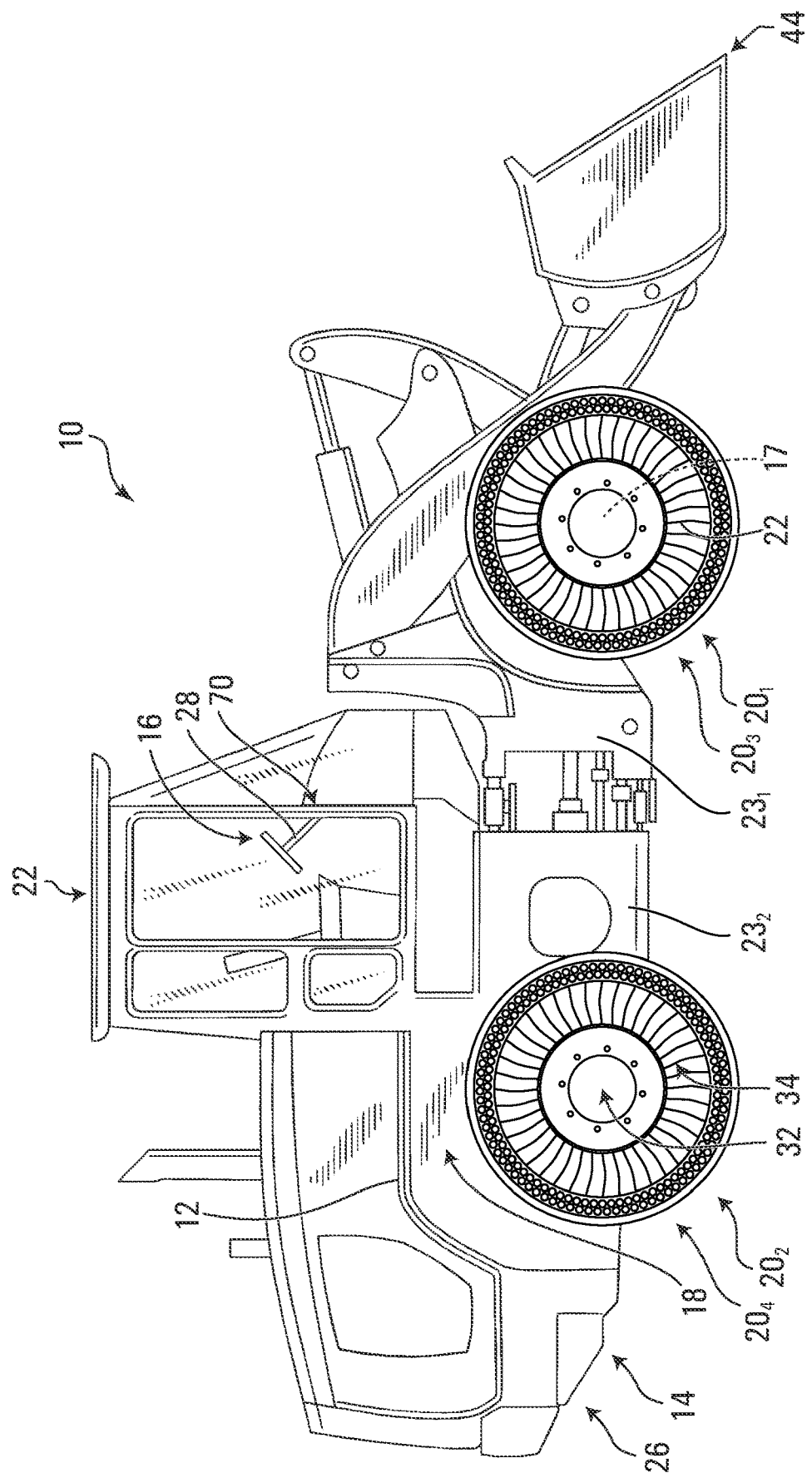
FIG. 1 shows an example of a vehicle comprising wheels comprising non-pneumatic tires in accordance with an embodiment.
Figure 2A:
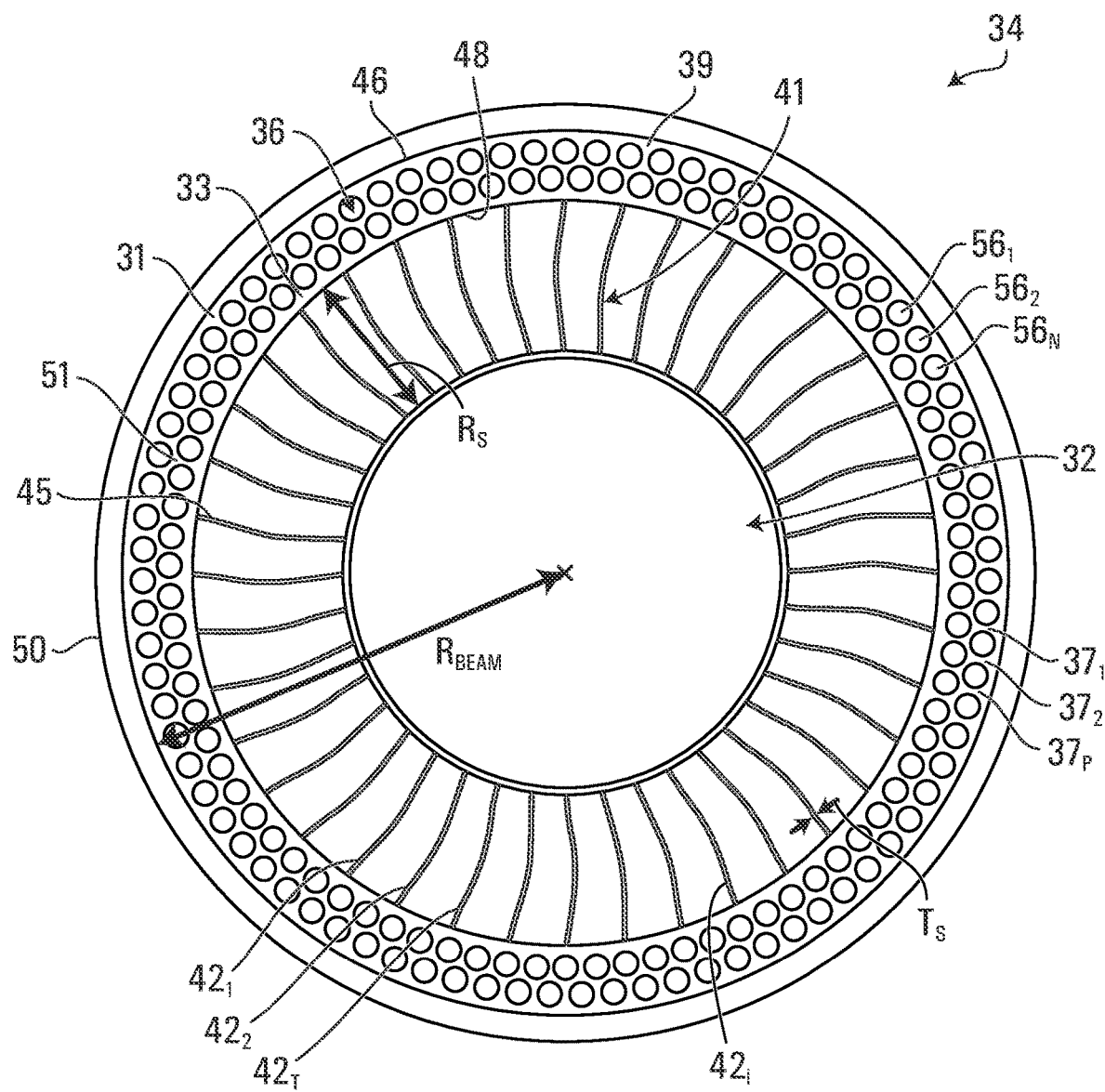
FIG. 2A shows a side-elevation view of a non-pneumatic tire of the vehicle of FIG. 1.
Figure 2B:
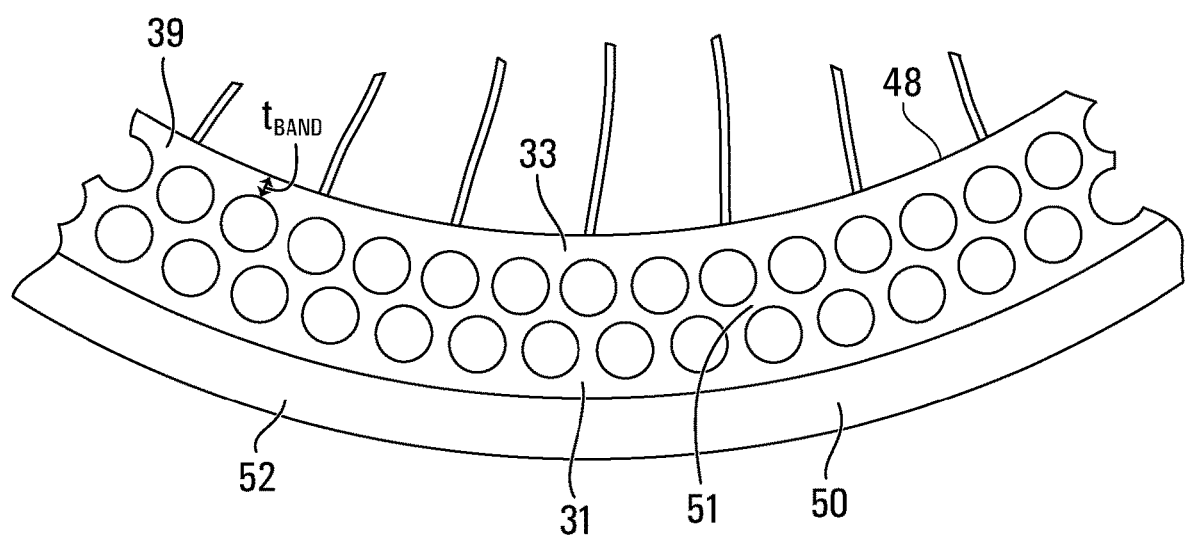
FIG. 2B shows an enlarged side-elevation view of an annular beam and a tread portion of the non-pneumatic tire of FIG. 2A.
Figure 3:
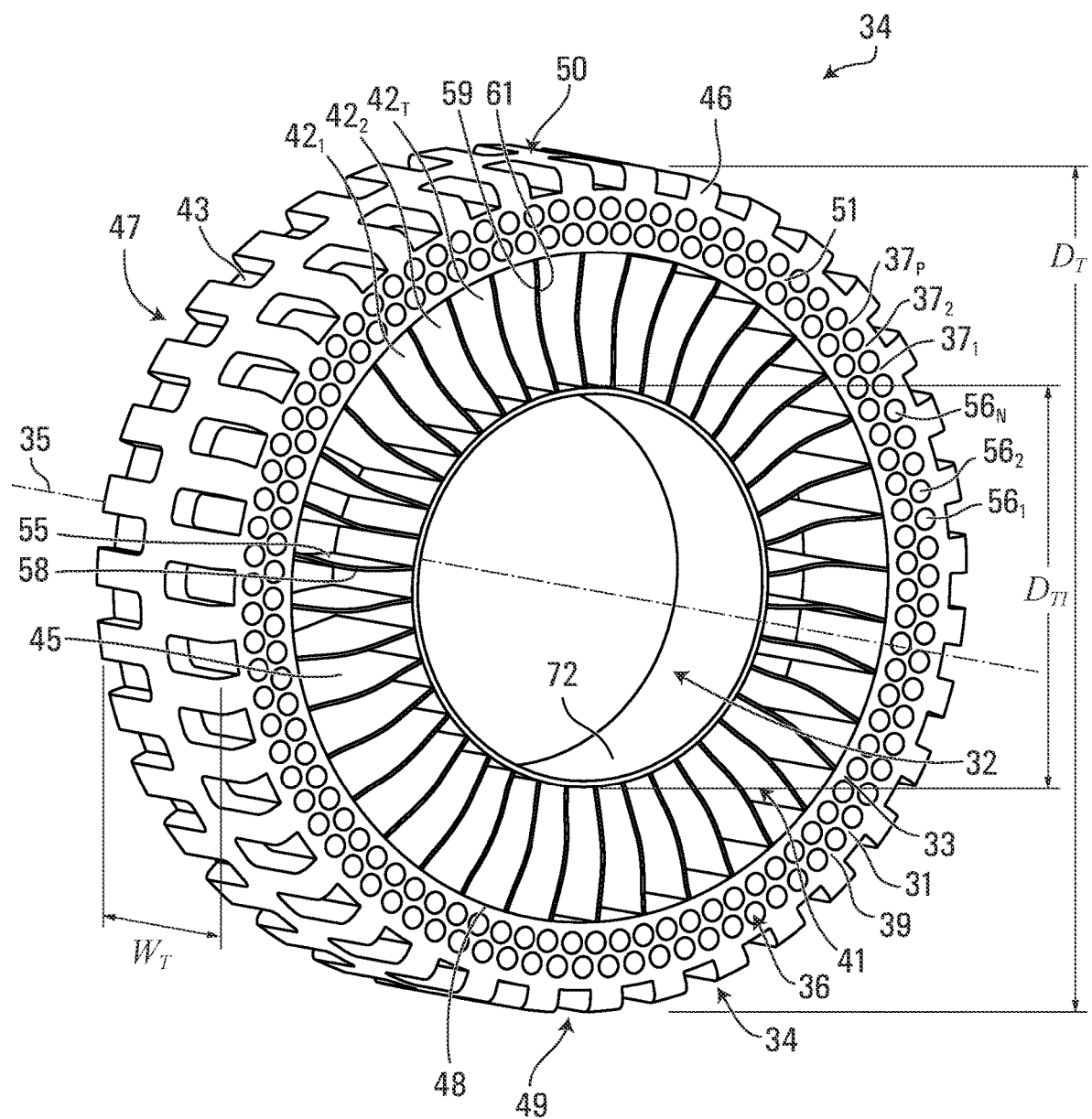
FIG. 3 shows a perspective view of the non-pneumatic tire of FIG. 2A.

FIG. 1 shows an example of a vehicle 10 comprising wheels $20_1$-$20_4$ in accordance with an embodiment. In this embodiment, the vehicle 10 is an industrial vehicle. The industrial vehicle 10 is a heavy-duty vehicle designed to travel off-road to perform industrial work using a work implement 44. In this embodiment, the industrial vehicle 10 is a construction vehicle for performing construction work using the work implement 44. More particularly, in this embodiment, the construction vehicle 10 is a loader (e.g., a skid-steer loader). The construction vehicle 10 may be a bulldozer, a backhoe loader, an excavator, a dump truck, or any other type of construction vehicle in other embodiments. In this example, the construction vehicle 10 comprises a frame 12, a powertrain 14, a steering system 16, a suspension 18, the wheels $20_1$-$20_4$, and an operator cabin 22, which enable a user, i.e., an operator, of the construction vehicle 10 to move the vehicle 10 on the ground and perform work using the work implement 44. The construction vehicle 10 has a longitudinal direction, a widthwise direction, and a height direction.

In this embodiment, as further discussed later, the wheels $20_1$-$20_4$ are non-pneumatic (i.e., airless) and may be designed to enhance their use and performance, including, for example, to be able to be used longer and/or in more challenging conditions, such as, for instance, by being more resistant to cracking or other damage which could lead to premature failure (e.g., due to manufacturing artifacts and/or rocks and other hazards that can cut, chip, or tear them during use). For example, an elastomeric material of at least one of an annular beam and an annular support of each of the wheels $20_1$-$20_4$ may have selected properties, such as greater crack propagation resistance when subject to tensile stress.

The powertrain 14 is configured for generating motive power and transmitting motive power to respective ones of the wheels $20_1$-$20_4$ to propel the construction vehicle 10 on the ground. To that end, the powertrain 14 comprises a prime mover 26, which is a source of motive power that comprises one or more motors. For example, in this embodiment, the prime mover 26 comprises an internal combustion engine. In other embodiments, the prime mover 26 may comprise another type of motor (e.g., an electric motor) or a combination of different types of motor (e.g., an internal combustion engine and an electric motor). The prime mover 26 is in a driving relationship with one or more of the wheels $20_1$-$20_4$. That is, the powertrain 14 transmits motive power generated by the prime mover 26 to one or more of the wheels $20_1$-$20_4$ (e.g., via a transmission and/or a differential) in order to drive (i.e., impart motion to) these one or more of the wheels $20_1$-$20_4$.

The steering system 16 is configured to enable the operator to steer the construction vehicle 10 on the ground. To that end, the steering system 16 comprises a steering device 28 that is operable by the operator to direct the construction vehicle 10 along a desired course on the ground. The steering device 28 may comprise a steering wheel or any other steering component (e.g., a joystick) that can be operated by the operator to steer the construction vehicle 10. The steering system 16 responds to the operator interacting with the steering device 28 by turning respective ones of the wheels $20_1$-$20_4$ to change their orientation relative to part of the frame 12 of the construction vehicle 10 in order to cause the vehicle 10 to move in a desired direction. In this example, a front frame member $23_1$ carrying front ones of the wheels $20_1$-$20_4$ is turnable in response to input of the operator at the steering device 28 to change its orientation and thus the orientation of the front ones of the wheels $20_1$-$20_4$ relative to a rear frame member $23_2$ of the construction vehicle 10 in order to steer the vehicle 10 on the ground.

The suspension 18 is connected between the frame 12 and the wheels $20_1$-$20_4$ to allow relative motion between the frame 12 and the wheels $20_1$-$20_4$ as the construction vehicle 10 travels on the ground. For example, the suspension 18 may enhance handling of the construction vehicle 10 on the ground by absorbing shocks and helping to maintain traction between the wheels $20_1$-$20_4$ and the ground. The suspension 18 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

The operator cabin 22 is where the operator sits and controls the construction vehicle 10. More particularly, the operator cabin 22 comprises a user interface 70 including a set of controls that allow the operator to steer the construction vehicle 10 on the ground and operate the work implement 44. The user interface 70 also comprises an instrument panel (e.g., a dashboard) which provides indicators (e.g., a speedometer indicator, a tachometer indicator, etc.) to convey information to the operator.

The wheels $20_1$-$20_4$ engage the ground to provide traction to the construction vehicle 10. More particularly, in this example, the front ones of the wheels $20_1$-$20_4$ provide front traction to the construction vehicle 10 while the rear ones of the wheels $20_1$-$20_4$ provide rear traction to the construction vehicle 10.

Each wheel $20_i$ comprises a non-pneumatic tire 34 for contacting the ground and a hub 32 for connecting the wheel $20_i$ to an axle 17. The non-pneumatic tire 34 is a compliant wheel structure that is not supported by gas (e.g., air) pressure and that is resiliently deformable (i.e., changeable in configuration) as the wheel $20_i$ contacts the ground.

Figure 4:
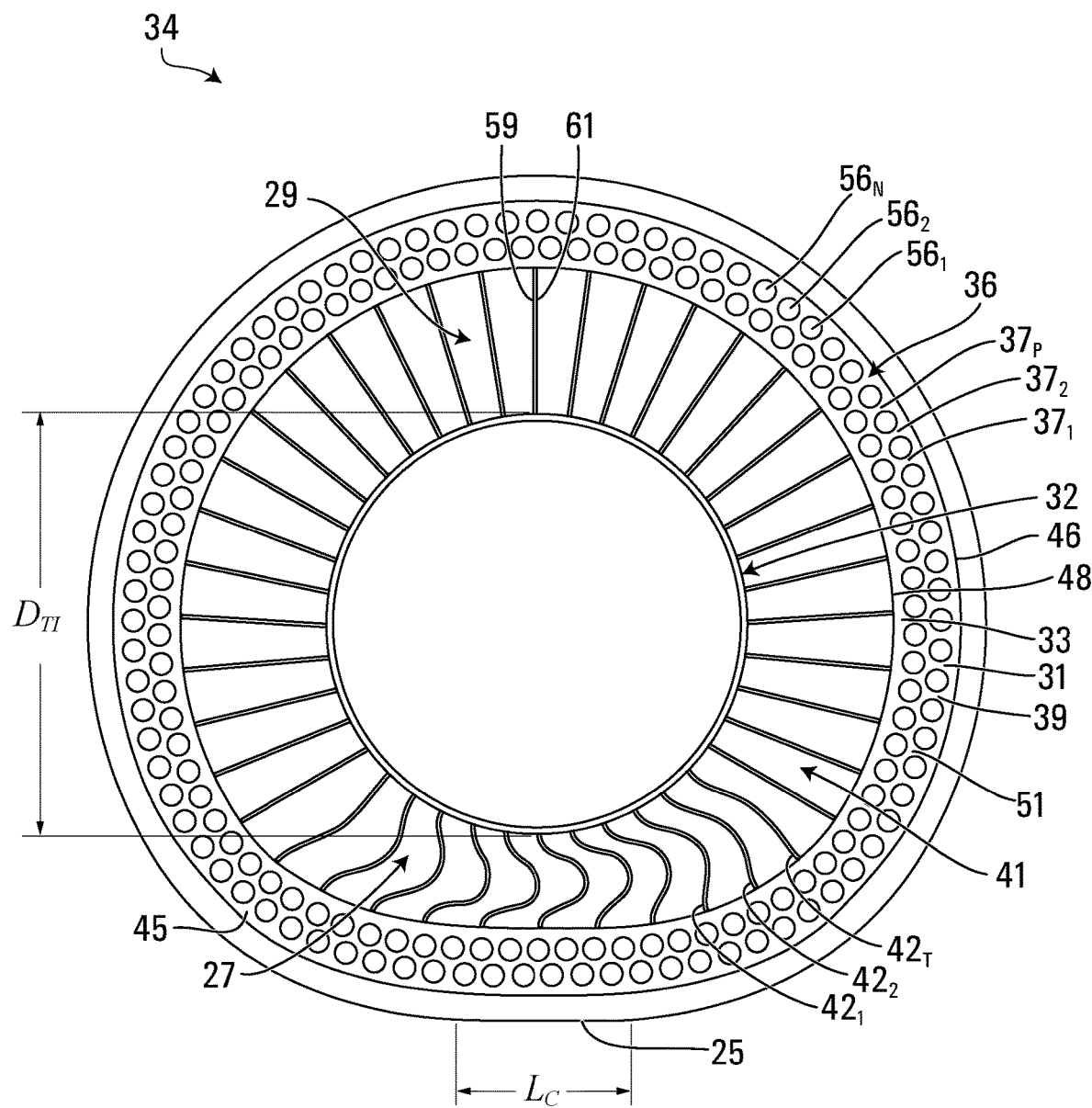
FIG. 4 shows a side-elevation view of the non-pneumatic tire of FIG. 2A when loaded.

With additional reference to FIGS. 2A to 5B, the non-pneumatic tire 34 has an axial direction defined by an axis of rotation 35 of the non-pneumatic tire 34 (also referred to as a lateral, widthwise or "Y" direction), a radial direction (also referred to as a "Z" direction), and a circumferential direction (also referred to as a "X" direction). The non-pneumatic tire 34 has an outer diameter $D_T$ and a width $W_T$. It comprises an inboard lateral side 47 for facing a center of the construction vehicle 10 in the widthwise direction of the construction vehicle 10 and an outboard lateral side 49 opposite the inboard lateral side 47. As shown in FIG. 4, when it is in contact with the ground, the non-pneumatic tire 34 has an area of contact 25 with the ground, which may be referred to as a "contact patch" of the non-pneumatic tire 34 with the ground. The contact patch 25 of non-pneumatic tire 34, which is a contact interface between the non-pneumatic tire 34 and the ground, has a dimension $L_C$, referred to as a "length", in the circumferential direction of the non-pneumatic tire 34 and another dimension, referred to as a "width", in the axial direction of the non-pneumatic tire 34.

The non-pneumatic tire 34 comprises an annular beam 36 and an annular support 41 that is disposed between the annular beam 36 and the hub 32 of the wheel $20_i$ and configured to support loading on the non-pneumatic tire 34 as the non-pneumatic tire 34 engages the ground. In this embodiment, the non-pneumatic tire 34 is tension-based such that the annular support 41 is configured to support the loading on the non-pneumatic tire 34 by tension. That is, under the loading on the non-pneumatic tire 34, the annular support 41 is resiliently deformable such that a lower portion 27 of the annular support 41 between the axis of rotation 35 of the non-pneumatic tire 34 and the contact patch 25 of the non-pneumatic tire 34 is compressed or bent (e.g., with little reaction force vertically) and an upper portion 29 of the annular support 41 above the axis of rotation 35 of the non-pneumatic tire 34 is in tension to support the loading.

The annular beam 36 of the non-pneumatic tire 34 is configured to deflect under the loading on the non-pneumatic tire 34 at the contact patch 25 of the non-pneumatic tire 34 with the ground. For instance, the annular beam 36 functions like a beam in transverse deflection. An outer peripheral extent 46 of the annular beam 36 and an inner peripheral extent 48 of the annular beam 36 deflect at the contact patch 25 of the non-pneumatic tire 34 under the loading on the non-pneumatic tire 34. In this embodiment, the annular beam 36 is configured to deflect such that it applies a homogeneous contact pressure along the length $L_C$ of the contact patch 25 of the non-pneumatic tire 34 with the ground. The annular beam 36 has a radius $R_{BEAM}$ defined by its outer peripheral extent 36.

More particularly, in this embodiment, the annular beam 36 comprises a shear beam 39 configured to deflect predominantly by shearing at the contact patch 25 under the loading on the non-pneumatic tire 34. That is, under the loading on the non-pneumatic tire 34, the shear beam 39 deflects significantly more by shearing than by bending at the contact patch 25. The shear beam 39 is thus configured such that, at a center of the contact patch 25 of the non-pneumatic tire 34 in the circumferential direction of the non-pneumatic tire 34, a shear deflection of the shear beam 39 is significantly greater than a bending deflection of the shear beam 39. For example, in some embodiments, at the center of the contact patch 25 of the non-pneumatic tire 34 in the circumferential direction of the non-pneumatic tire 34, a ratio of the shear deflection of the shear beam 39 over the bending deflection of the shear beam 39 may be at least 1.2, in some cases at least 1.5, in some cases at least 2, in some cases at least 3, and in some cases even more (e.g., 4 or more). For instance, in some embodiments, the annular beam 36 may be designed based on principles discussed in U.S. Pat. No. 9,751,270, which is hereby incorporated by reference herein, in order to achieve the homogeneous contact pressure along the length $L_C$ of the contact patch 25 of the non-pneumatic tire 34 with the ground.

In this example of implementation, the shear beam 39 comprises an outer annular portion 31, an inner annular portion 33, and a shearing annular portion 38 between the outer annular portion 31 and the inner annular portion 33 that are configured to cause the shear beam 39 to deflect more by shearing than by bending at the contact patch 25 of the tire 34. In this embodiment, the shearing annular portion 38 comprises a plurality of voids $56_1$-$56_N$ between the outer annular portion 31 and the inner annular portion 33, which may be respectively referred to as an "outer band" 31 and an "inner band" 33 of the shear beam 39. The shearing annular portion 38 also comprises a plurality of interconnecting members $37_1$-$37_P$ that extend between the outer band 31 and the inner band 33 and are disposed between respective ones of the voids $56_1$-$56_N$. The interconnecting members $37_1$-$37_P$ may be referred to as "webs" such that the shear beam 39 may be viewed as comprising "web-like" or "webbing" portions. In this embodiment, the shear beam 39 comprises an intermediate band 51 between the outer band 31 and the inner band 33 such that the openings $56_1$-$56_N$ and the interconnecting members $37_1$-$37_P$ are arranged into two circumferential rows between adjacent ones of the bands 31, 51, 33.

Each of the inner band 33, the outer band 33 and the intermediate band 51 is an annular part of the shear beam 39 extending continuously in the circumferential direction of the non-pneumatic tire 34. A thickness $t_{BAND}$ of each of the inner band 33, the outer band 33 and the intermediate band 51 in the radial direction of the tire 34 may have any suitable value. In various embodiments, the thickness $t_{BAND}$ of the inner band 33, the thickness $t_{BAND}$ of the outer band 33 and/or the thickness $t_{BAND}$ of the intermediate band 51 may be identical or different.

The voids $56_1$-$56_N$ of the shear beam 39 help the shear beam 39 to deflect predominantly by shearing at the contact patch 25 under the loading on the non-pneumatic tire 34. In this embodiment, the voids $56_1$-$56_N$ are openings that extend from the inboard lateral side 54 to the outboard lateral side 49 of the non-pneumatic tire 34. That is, the openings $56_1$-$56_N$ extend laterally though the shear beam 39 in the axial direction of the non-pneumatic tire 34. The openings $56_1$-$56_N$ may extend laterally without reaching the inboard lateral side 54 and/or the outboard lateral side 49 of the non-pneumatic tire 34 in other embodiments. In this example, a cross-section of each of the openings $56_1$-$56_N$ is circular. The cross-section of each of the openings $56_1$-$56_N$ may be shaped differently in other examples (e.g., polygonal, partly curved and partly straight, etc.). In some cases, different ones of the openings $56_1$-$56_N$ may have different shapes. In some cases, the cross-section of each of the openings $56_1$-$56_N$ may vary in the axial direction of the wheel $20_i$. For instance, in some embodiments, the openings $56_1$-$56_N$ may be tapered in the axial direction of the wheel $20_i$ such that their cross-section decreases inwardly axially (e.g., to help minimize debris accumulation within the openings $56_1$-$56_N$).

Figure 6:
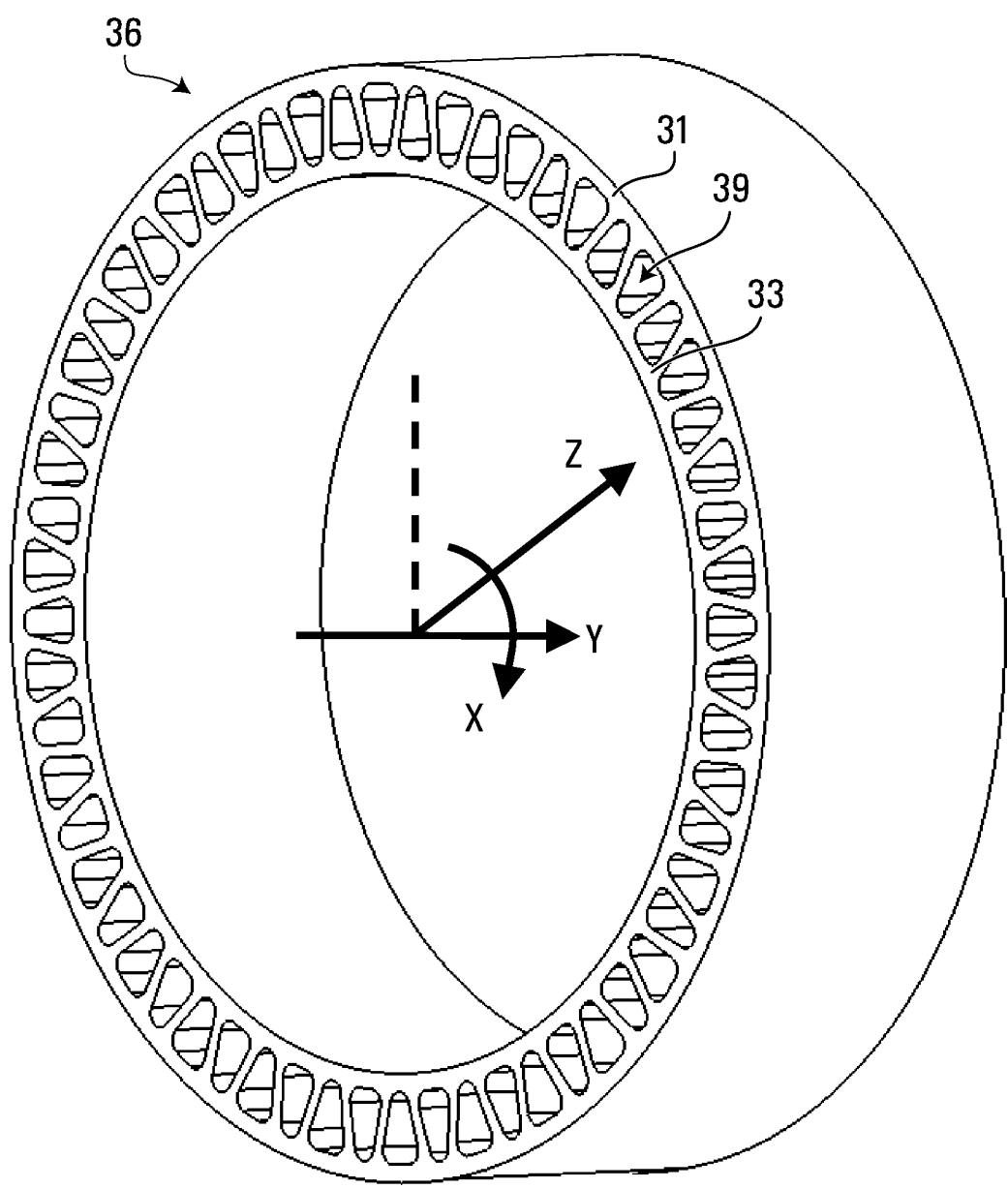
FIG. 6 shows a perspective view of an example of the annular beam according to another embodiment.
Figure 7:
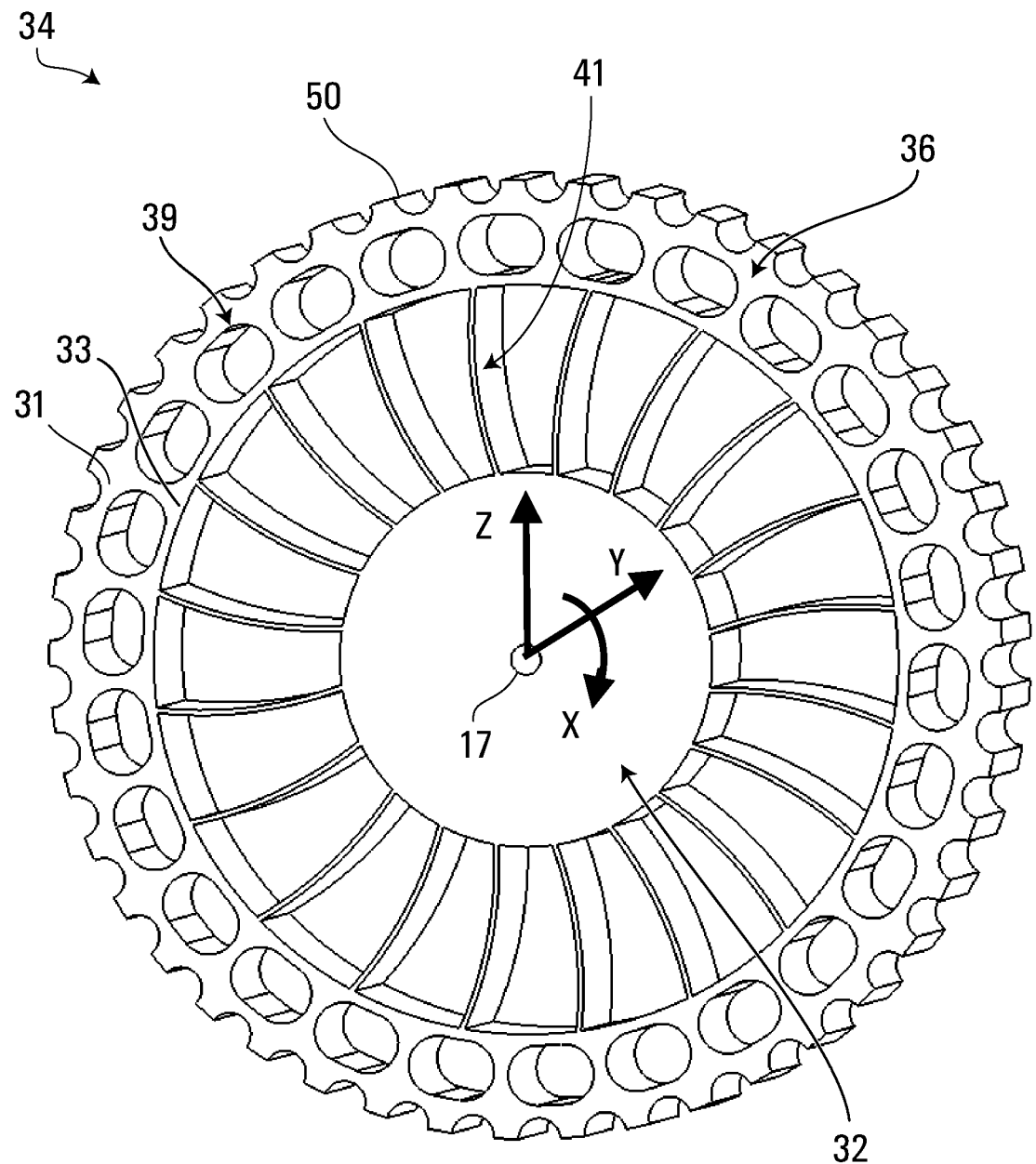
FIG. 7 shows a perspective view of an example of the non-pneumatic tire according to another embodiment.

The shear beam 39, including the voids $56_1$-$56_N$ and the interconnecting members $37_1$-$37_P$, may be arranged in any other suitable way in other embodiments. For example, in other embodiments, the shear beam 39 may comprise a plurality of intermediate bands or no intermediate band like the intermediate band 51 (see e.g. FIGS. 6 and 7), the voids $56_1$-$56_N$ and/or the interconnecting members $37_1$-$37_P$ may have any other suitable shapes, etc.

In this embodiment, the non-pneumatic tire 34 comprises a tread 50 for enhancing traction between the non-pneumatic tire 34 and the ground. The tread 50 is disposed about the outer peripheral extent 46 of the annular beam 36, in this case about the outer band 31 of the shear beam 39. The tread 50 may be implemented in any suitable way in other embodiments (e.g., may comprise a plurality of tread recesses, tread projections, etc.).

The annular support 41 is configured to support the loading on the non-pneumatic tire 34 as the non-pneumatic tire 34 engages the ground. As mentioned above, in this embodiment, the annular support 41 is configured to support the loading on the non-pneumatic tire 34 by tension. More particularly, in this embodiment, the annular support 41 comprises a plurality of support members $42_1$-$42_T$ that are distributed around the non-pneumatic tire 34 and resiliently deformable such that, under the loading on the non-pneumatic tire 34, lower ones of the support members $42_1$-$42_T$ in the lower portion 27 of the annular support 41 (between the axis of rotation 35 of the non-pneumatic tire 34 and the contact patch 25 of the non-pneumatic tire 34) are compressed and bend while upper ones of the support members $42_1$-$42_T$ in the upper portion 29 of the annular support 41 (above the axis of rotation 35 of the non-pneumatic tire 34) are tensioned to support the loading. As they support load by tension when in the upper portion 29 of the annular support 41, the support members $42_1$-$42_T$ may be referred to as "tensile" members.

In this embodiment, the support members $42_1$-$42_T$ are elongated and extend from the annular beam 36 towards the hub 32 generally in the radial direction of the non-pneumatic tire 34. In that sense, the support members $42_1$-$42_T$ may be referred to as "spokes" and the annular support 41 may be referred to as a "spoked" support.

More particularly, in this embodiment, the inner peripheral extent 48 of the annular beam 36 is an inner peripheral surface of the annular beam 36 and each spoke $42_i$ extends from the inner peripheral surface 48 of the annular beam 36 towards the hub 32 generally in the radial direction of the non-pneumatic tire 34 and from a first lateral end 55 to a second lateral end 58 in the axial direction of the non-pneumatic tire 34. In this case, the spoke $42_i$ extends in the axial direction of the non-pneumatic tire 34 for at least a majority of a width $W_T$ of the non-pneumatic tire 34. For instance, in some embodiments, the spoke $42_i$ may extend in the axial direction of the non-pneumatic tire 34 for more than half, in some cases at least 60%, in some cases at least 80%, and in some cases an entirety of the width $W_T$ of the non-pneumatic tire 34. Moreover, the spoke $42_i$ has a thickness $T_S$ measured between opposite surfaces 59, 61 of the spoke $42_i$ that is significantly less than a length and width of the spoke $42_i$.

Also in this embodiment, each spoke $42_i$ extends freely (i.e., without attaching or otherwise intersecting other material of the tire 34) from the annular beam 36 towards the hub 32 for at least a majority (i.e., a majority or an entirety) of a radial distance $R_s$ between the annular beam 36 and the hub 32. More particularly, in this embodiment, each spoke $42_i$ extends freely from the annular beam 36 to the hub 32, i.e., for the entirety of the radial distance $R_s$ between the annular beam 36 and the hub 32.

Thus, in this embodiment, each spoke $42_i$ may have a free span length that is a significant fraction of the outer diameter $D_T$ of the non-pneumatic tire 34. The free span length of the spoke $42_i$ is the curvilinear distance in the radial direction from one extremity of the spoke $42_i$ to an opposite extremity of the spoke $42_i$, between which there is no attaching or otherwise intersecting material. In some embodiments, the free span length of the spoke $42_i$ may be at least 15% of the outer diameter $D_T$ of the tire 34, in some cases at least 20% of the outer diameter $D_T$ of the tire 34, in some cases at least 25% of the outer diameter $D_T$ of the tire 34, and in some cases even more. Spoke surface strains decrease with the square of the free span length of the spoke $42_i$; thus, it may be advantageous for crack propagation resistance to maximize the free span spoke length.

When the non-pneumatic tire 34 is in contact with the ground and bears a load (e.g., part of a weight of the construction vehicle 10), respective ones of the spokes $42_1$-$42_T$ that are disposed in the upper portion 29 of the spoked support 41 (i.e., above the axis of rotation 35 of the non-pneumatic tire 34) are placed in tension while respective ones of the spokes $42_1$-$42_T$ that are disposed in the lower portion 27 of the spoked support 41 (i.e., adjacent the contact patch 25) are placed in compression. The spokes $42_1$-$42_T$ in the lower portion 27 of the spoked support 41 which are in compression bend in response to the load. Conversely, the spokes $42_1$-$42_T$ in the upper portion 29 of the spoked support 41 which are placed in tension support the load by tension.

The non-pneumatic tire 34 has an inner diameter $D_{TI}$ and the outer diameter $D_T$. A sectional height of the non-pneumatic tire 34 is half of a difference between the outer diameter $D_T$ and the inner diameter $D_{TI}$ of the tire 34. The sectional height of the tire may be significant in relation to the width $W_T$ of the tire 34. In other words, an aspect ratio AR of the tire 34 corresponding to the sectional height over the width $W_T$ of the tire 34 may be relatively high. For instance, in some embodiments, the aspect ratio AR of the tire 34 may be at least 60%, in some cases at least 80%, in some cases at least 100%, and in some cases even more. Also, the inner diameter $D_{TI}$ of the tire 34 may be significantly less than the outer diameter $D_T$ of the tire 34 as this may help for compliance of the non-pneumatic tire 34, as well as increasing the spoke free length. For example, in some embodiments, the inner diameter $D_{TI}$ of the non-pneumatic tire 34 may be no more than half of the outer diameter $D_T$ of the non-pneumatic tire 34, in some cases less than half of the outer diameter $D_T$ of the non-pneumatic tire 34, in some cases no more than 40% of the outer diameter $D_T$ of the non-pneumatic tire 34, and in some cases even a smaller fraction of the outer diameter $D_T$ of the non-pneumatic tire 34. In the specific embodiment of FIG. 2A, $D_T$ =33", $W_T$ =12" and $D_{TI}$ =16.5". This tire size is often used in the construction industry for example for skid-steer loaders and telehandlers.

The hub 32 is disposed centrally of the non-pneumatic tire 34 and connects the wheel $20_i$ to the axle 17. The hub 32 may be implemented in any suitable manner.

The wheel $20_i$ may be made up of one or more materials. The non-pneumatic tire 34 comprises a tire material 45 that makes up at least a substantial part (i.e., a substantial part or an entirety) of the non-pneumatic tire 34. The hub 32 comprises a hub material 72 that makes up at least a substantial part of the hub 32. In some embodiments, the tire material 45 and the hub material 72 may be different materials. In other embodiments, the tire material 45 and the hub material 72 may be a common material (i.e., the same material).

In this embodiment, the tire material 45 constitutes at least part of the annular beam 36 and at least part of the spokes $42_1$-$42_T$. Also, in this embodiment, the tire material 45 constitutes at least part of the tread 50. More particularly, in this embodiment, the tire material 45 constitutes at least a majority (e.g., a majority or an entirety) of the annular beam 36, the tread 50, and the spokes $42_1$-$42_T$. In this example of implementation, the tire material 45 makes up an entirety of the non-pneumatic tire 34, including the annular beam 36, the spokes $42_1$-$42_T$, and the tread 50. The non-pneumatic tire 34 is thus monolithically made of the tire material 45. In this example, therefore, the annular beam 36 is free of (i.e., without) substantially inextensible reinforcement running in the circumferential direction of the wheel $20_i$ (e.g., a layer of metal, composite (e.g., carbon fibers, other fibers), and/or another material that is substantially inextensible running in the circumferential direction of the non-pneumatic tire 34). In that sense, the annular beam 36 may be said to be "unreinforced".

The tire material 45 is elastomeric. For example, in this embodiment, the tire material 45 comprises a polyurethane (PU) elastomer. Various considerations for selection of the tire material 45 are further discussed below.

The non-pneumatic tire 34 may comprise one or more additional materials in addition to the tire material 45 in other embodiments (e.g., different parts of the annular beam 36, different parts of the tread 50, and/or different parts of the spokes $42_1$-$42_T$ may be made of different materials). For example, in some embodiments, different parts of the annular beam 36, different parts of the tread 50, and/or different parts of the spokes $42_1$-$42_T$ may be made of different elastomers. As another example, in some embodiments, the annular beam 36 may comprise one or more substantially inextensible reinforcing layers running in the circumferential direction of the wheel $20_i$ (e.g., one or more layers of metal, composite (e.g., carbon fibers, glass fibers, other fibers), and/or another material that is substantially inextensible running in the circumferential direction of the wheel $20_i$).

In this embodiment, the hub material 72 is polymeric. More particularly, in this example of implementation, the hub material 72 is elastomeric. For example, in this embodiment, the hub material 72 comprises a polyurethane (PU) elastomer. The hub material 72 may be any other suitable material in other embodiments. For example, in other embodiments, the hub material 72 may comprise a stiffer polyurethane material. In some embodiments, the hub material 72 may not be polymeric. For instance, in some embodiments, the hub material 72 may be metallic (e.g., steel, aluminum, etc.).

The hub 32 may comprise one or more additional materials in addition to the hub material 72 in other embodiments (e.g., different parts of the hub 32 may be made of different materials).

The wheel $20_i$ may be manufactured in any suitable way. For example, in some embodiments, the tire 34 and/or the hub 32 may be manufactured via centrifugal casting, a.k.a. spin casting, which involves pouring one or more materials of the wheel $20_i$ into a mold that rotates about an axis. The material(s) is(are) distributed within the mold via a centrifugal force generated by the mold's rotation. In some cases, vertical spin casting, in which the mold's axis of rotation is generally vertical, may be used. In other cases, horizontal spin casting, in which the mold's axis of rotation is generally horizontal, may be used. The wheel $20_i$ may be manufactured using any other suitable manufacturing processes in other embodiments.

In some embodiments, the non-pneumatic tire 34 may have a resistance to crack propagation that is enhanced so as to reduce a potential for the non-pneumatic tire 34 to prematurely fail due to crack propagation within the non-pneumatic tire 34. Notably, in some cases, if left unchecked, small irregularities on surfaces of the non-pneumatic tire 34 that are a product of a manufacturing process of the non-pneumatic tire 34 (e.g., molding) and/or wear of the non-pneumatic tire 34 (e.g., a cut or other damage on a surface of the non-pneumatic tire 34) may arise and act as sites for cracks to be initiated and then expanded and propagated as the non-pneumatic tire 34 undergoes more usage cycles. For example, construction and mining tires operate in hostile environments. Rocks and other hazards can cut, chip, or tear the structure of the tire. Crack propagation resistance may be a key performance attribute for tires operating in these environments.

Thus, in some embodiments, the resistance to crack propagation of the non-pneumatic tire 34 may be increased to prevent or at least significantly limit crack propagation within the non-pneumatic tire 34 by properties of the tire material 45.

Before discussing examples of ways in which the resistance to crack propagation of the non-pneumatic tire 34 may be achieved based on the properties of the tire material 45 in some embodiments, certain aspects of stress and crack propagation will be discussed, without wishing to be bound by any theory.

Figure 5A:
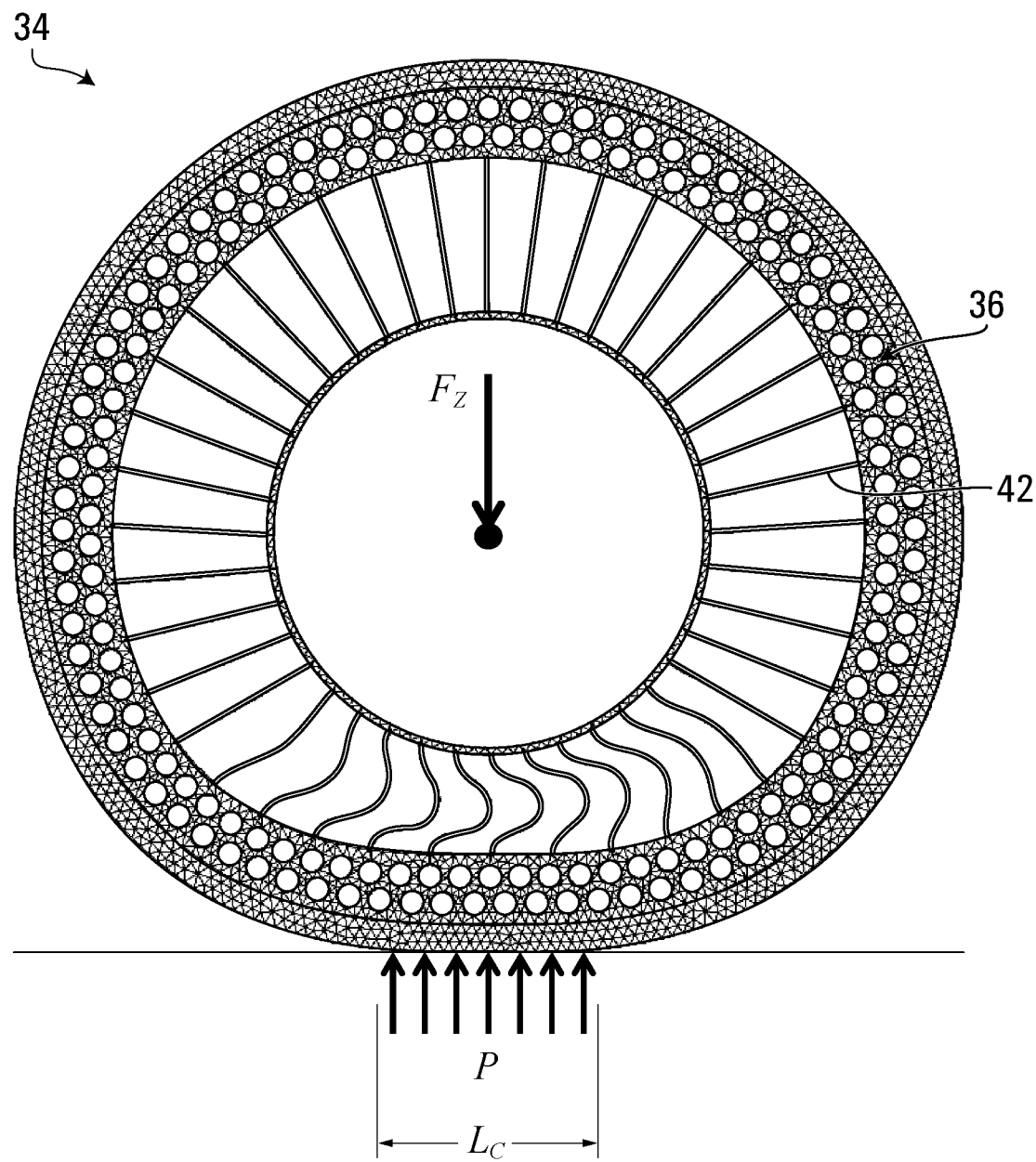
FIGS. 5A and 5B show an example of structural modeling results and maximum principle stress predictions for the non-pneumatic tire of FIG. 4.
Figure 5B:
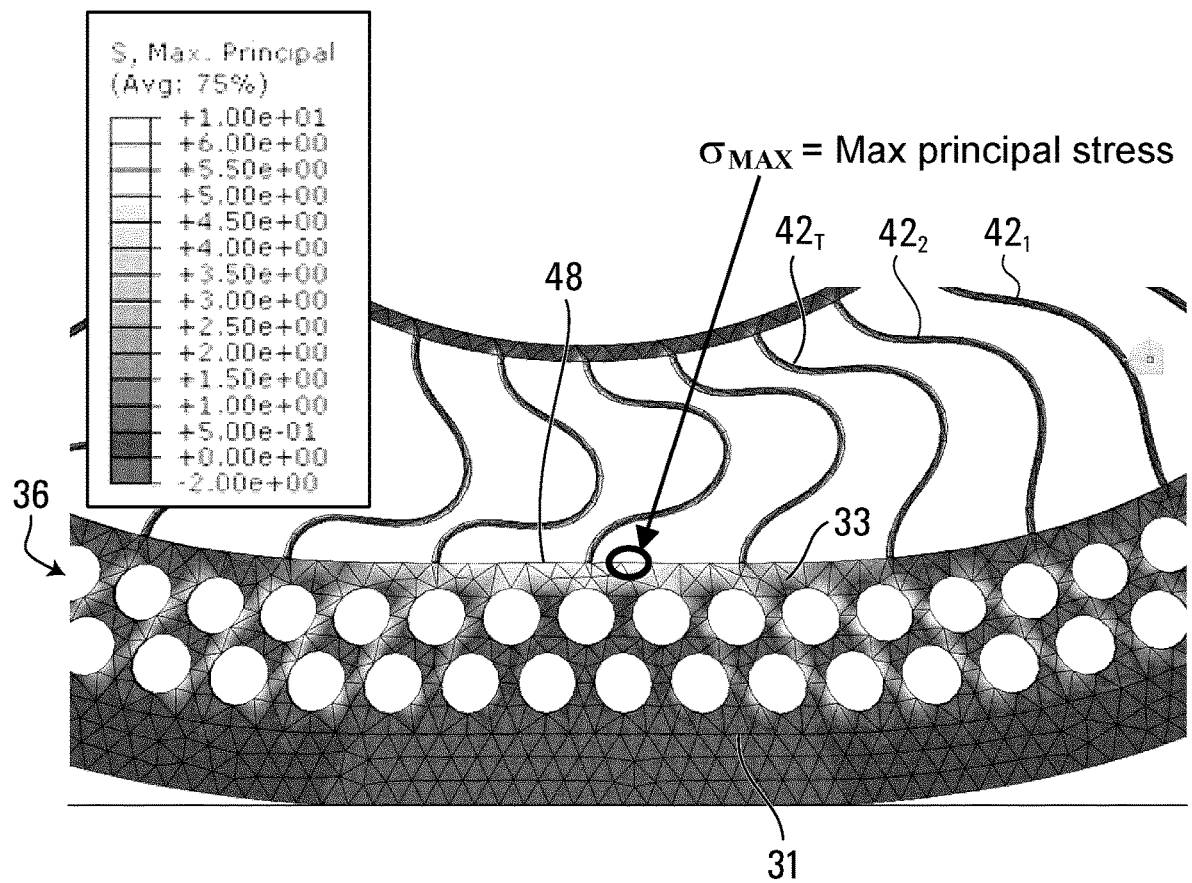

With further reference to FIGS. 5A and 5B, a finite-element model and a maximum principle stress $\sigma_{MAX}$ are shown for an example of the annular beam 36 of the non-pneumatic tire 34. In this example, a modulus of elasticity E of the tire material 45 is 130 MPa, i.e., isotropic modulus E=130 MPa. The modulus of elasticity E is Young's tensile modulus of elasticity, which can be measured according to ISO 527-1/-2. When loaded to a vertical load $F_Z$, the non-pneumatic tire 34 develops its contact patch 25 such that it has the length $L_c$ and the contact pressure P with the ground. The maximum principle stress $\sigma_{MAX}$ shown in a gray color scale in FIG. 5B shows that, when the non-pneumatic tire 34 is loaded to $F_Z$=20000 N, $\sigma_{MAX}$=6.4 MPa. Since E=130 MPa, the approximate maximum principle strain is 0.05. The location of the maximum principle stress $\sigma_{MAX}$ is shown as being on the inner peripheral extent 48 of the annular beam 36. During normal loading, the maximum principle stress $\sigma_{MAX}$ is found on the inner peripheral extent 48 of the annular beam 36 and increases as a function of the load $F_Z$.

Through experimentation with physical tires such as the non-pneumatic tire 34, as well as finite-element modeling results, surprising trends relating to effects of the modulus of elasticity E of the tire material 45, the thickness $T_{BAND}$ of the inner band 33 and the load Fz on the maximal principal stress $\sigma_{MAX}$ were found. Further, gaps have been identified in current elastomer testing metrics and descriptors. Based on study of testing methods used for metals in aerospace (e.g., aircraft and gas turbines), tension-based crack propagation test methods have been developed that are suitable for elastomers used for NPTs such as the non-pneumatic tire 34. Examples of specifications of crack propagation rates as a function of a tensile stress intensity or strain energy release rate are notably disclosed in U.S. Pat. Nos. 5,213,639, 5,156,808, 6,712,315. By applying test method development and results to tire architecture optimization, ways have been discovered to specify materials and design values that enable NPTs like the non-pneumatic tire 34, which may not comprise circumferentially inextensible reinforcement, to perform at a very satisfactory level in normal and overload conditions. For example, in some embodiments, a lack of substantially inextensible reinforcement in the annular beam 36 in the circumferential direction of the tire 34 may be a positive design attribute, as extensibility of the annular beam 36 may be engineered in an intelligent fashion, such that the tension stresses in overload conditions do not overly penalize the crack propagation resistance of the tire material 45.

Figure 8:
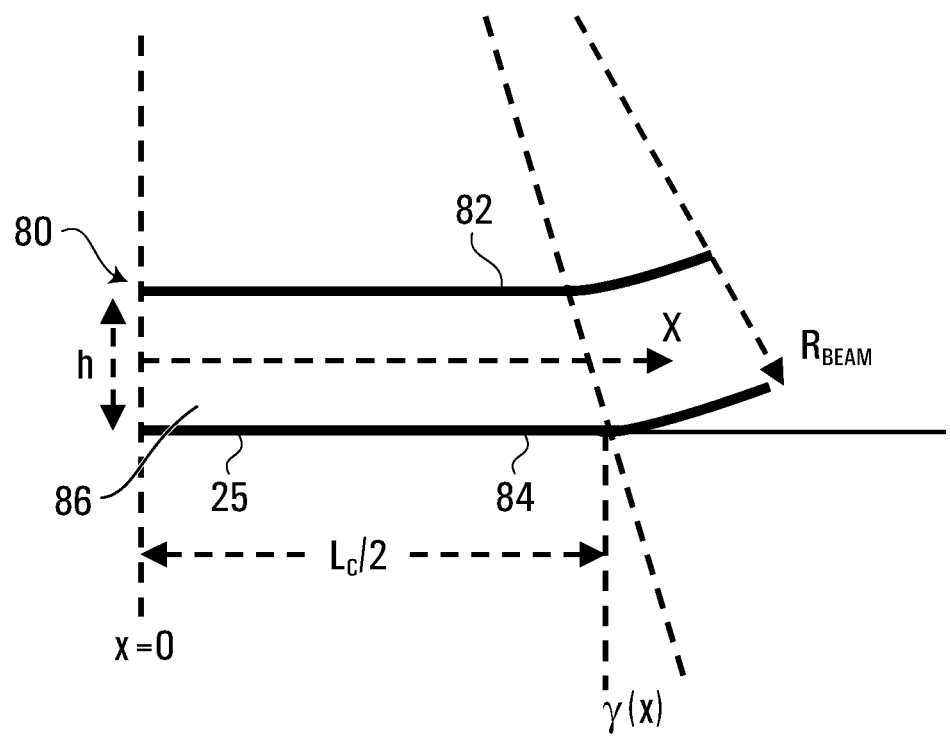
FIG. 8 shows a deformed cross section of an annular beam having inner and outer layers of substantially inextensible reinforcements.

FIG. 8 shows a ZX cross section of an example of an annular beam 80 that is in contact with a flat contact surface and that is different from the annular beam 36 of the non-pneumatic tire 34 discussed in embodiments considered above, notably in that it comprises two layers of inextensible reinforcement, namely an inner layer 82 and an outer layer 84, which together encapsulate a shear layer 86 of an elastomeric material having a shear modulus G and a thickness h. The outer inextensible reinforcement layer 84 has an undeformed radius $R_{BEAM}$. Prior art, such as U.S. Pat. No. 6,769,465, discloses that:

$$P = \frac{Gh}{R_{BEAM}} \quad (1)$$

where: P=ground contact pressure,
G=shear layer shear modulus
H=shear layer thickness
$R_{BEAM}$=radius of outer reinforcement layer 84

Given that the inner and outer layers 84, 86 are inextensible, it can be shown that the shear layer shear angle γ(x) is a function of x, which is the longitudinal distance from the center of the contact patch 25:

$$\gamma(x) = \frac{x}{R_{BEAM}} \quad (2)$$

The shear deformation creates a shear stress in the shear layer 86, the resultant of which is carried by the two inextensible reinforcement layers 82, 84. The inner layer 82 operates in tension, while the outer layer 84 operates in compression. The maximum tension force in the inner layer 82 will occur at the tire centerline, where X=0 in FIG. 8.

This force can be estimated according to the following equation, for force per unit width:

$$F_{MAX} = \int_{L_C/2}^{0} G\gamma(x)dx \tag{3}$$

where: $L_C$=contact patch length

Performing the integration of Equation (3), in light of Equation (2), one obtains:

$$F_{MAX} = -G \frac{L_C^2}{8R_{BEAM}} \tag{4}$$

Equation (4) shows that the force, and therefore the stress, in the inner layer 82 of inextensible reinforcement will increase exponentially with the contact patch length $L_C$.

As in some embodiments the annular beam 36 of the non-pneumatic tire 34 does not comprise inextensible reinforcements, the relationship between the tensile stress of the inner band 33 and the tire load is not necessarily exponential. Furthermore, ranges of values of the modulus of elasticity E and the thickness $T_{BAND}$ of the inner band 33 that favorably decouple the maximum tensile stress from the tire load were found, in particular in overload conditions.

Because a large volume of the tire material 45 in the inner band 33 of the annular beam 36 is solicited in direct tension, tensile stress $\sigma_{MAX}$ in the annular beam 36 is a stress to consider in order to reduce crack propagation. Specifically, the ZY cross section of the inner band 33 of the shear beam 39 oscillates from near zero stress outside of the contact patch 25, to tensile stress as the cross section rotates into the contact patch 25, and then back to zero stress. This is similar to a tensile test specimen exposed to an oscillating stress σ. A strain energy density of a uniaxial tensile test specimen is approximately:

$$U = \frac{\sigma\epsilon}{2} = \frac{E\epsilon^2}{2} = \frac{\sigma^2}{2E} \tag{5}$$

Where: σ=uniaxial stress
ε=uniaxial strain
E=Young's modulus
U=strain energy density In a compression-based non-pneumatic tire, elastomers do not carry load in tension, but in bending and/or in direct compression. In the non-pneumatic tire 34, the spoked support 41 also bends in the area of the contact patch 25 and, as shown in FIG. 5B, surface stresses in the spokes 42$_i$ can equal or moderately exceed $\sigma_{MAX}$ in the annular beam 36. However, it was found that crack propagation rates for the spokes 42$_i$ may be lower than crack propagation rates for the annular beam 36. This may result from the potential energy of a beam, compared to the potential energy of a tensile test specimen.

Figure 9:
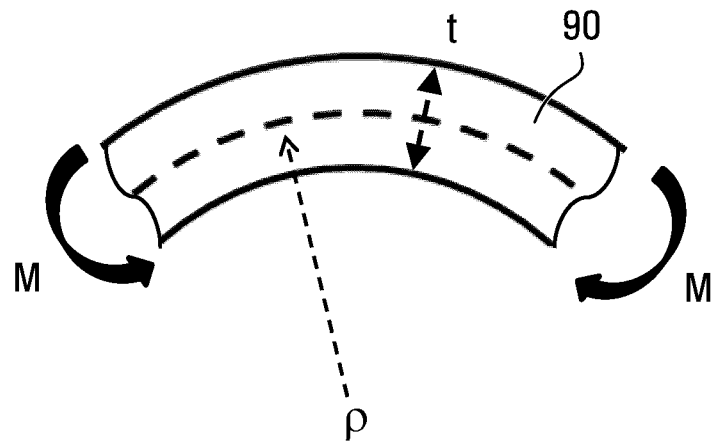
FIG. 9 shows a flexure test specimen in a deformed state, exposed to a bending stress.

FIG. 9 shows a beam 90 having a thickness t, deformed to a radius of curvature ρ, by a moment M. The potential energy of the beam 90 is:

$$U = \int \frac{M^2}{2EI} dy \tag{6}$$

where: I=beam moment of inertia
From basic Euler beam theory:

$$M = \frac{EI}{\rho} \tag{7}$$

Integrating Equation (6) taking unit beam length and depth, and substituting in Equation (7):

$$U = \frac{EI}{2\rho^2} \tag{8}$$

where: ρ is deformed curvature

In this case, $I = \frac{1}{12} t^3$. Also, for the deformed beam of FIG. 9, $$\epsilon = \frac{t}{2\rho} \tag{9}$$

Where: ε=maximum strain at beam outer surface
Making these substitutions:

$$U = \frac{E\epsilon^2 t}{6} \tag{10}$$

Taking t=1, and noting that only 50% of the beam develops tension stress and strain:

$$U = \frac{E\epsilon^2}{12} \tag{11}$$

Equation (11) can then be compared to Equation (5). At equal maximum strain, uniaxial tension has six times the strain energy density available for crack propagation, compared to a beam in pure flexion. A flexed beam does not have a uniform strain energy density. The strain and stress vary from zero at the neutral axis to a maximum at the outer beam fiber. Therefore, a large volume of the beam has a low strain energy density. This is more favorable for crack propagation resistance, compared to a uniaxial test, for which the strain, stress, and strain energy density are homogeneous.

Yet, industry standards for elastomer crack propagation are flex tests. There is accordingly a gap between elastomer characterization and actual functioning of the material 45 from which the non-pneumatic tire 34 can be made.

The spoked support 41 of the non-pneumatic tire 34 does work in tension outside the contact patch 25, with the hub 32 essentially hanging from the annular beam 36 and supported in tension by the spokes 42$_i$. Thus, for a tension-based non-pneumatic tire, a tension-based definition for crack propagation may also be appropriate for spoke material specification. Direct tension stresses in the spokes 42$_1$-42$_T$ may be minimized by increasing the number of spokes. Also, stresses due to bending may be reduced by increasing the free span of each spoke 42$_i$, such that the free span is a significant fraction of the outer diameter $D_T$ of the tire 34

Tension crack propagation tests were performed that consider the pertinence of uniaxial tension testing development for crack propagation and the importance of designing and controlling the tension stresses in the annular beam 36 and the spokes 42$_1$-42$_T$.

Figure 10:
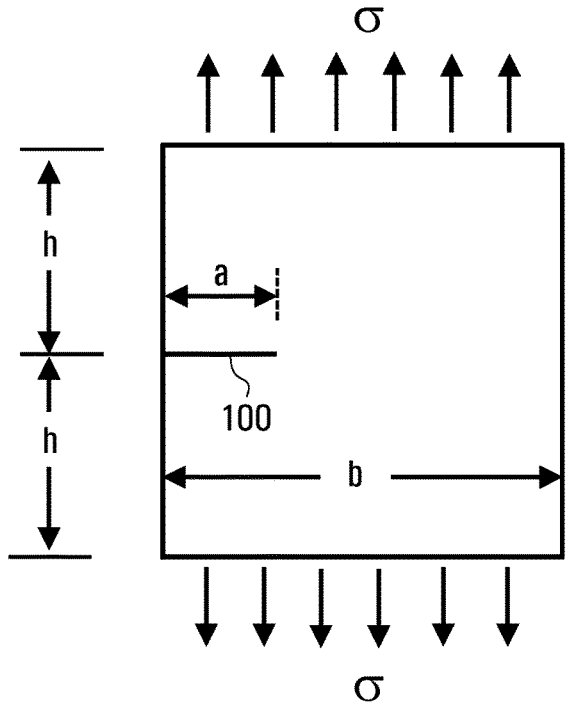
FIG. 10 shows a tensile test specimen of an elastomeric material exposed to a stress with an initial edge crack.

A uniaxial tension crack propagation test was developed for elastomers using an MTS machine Landmark Model 370.10. Test specimen geometry is shown in FIG. 10. In the embodiment of FIG. 10, b=25 mm, and h=50 mm, with a sample thickness of 2 mm. The MTS was programmed to apply the stress using a sinusoidal signal at 2 HZ frequency, varying from a stress near zero to stress=$\sigma_{MAX}$ such that, with this loading, $\Delta\sigma_{MAX}=\sigma_{MAX}$. Values of $\sigma_{MAX}$ range from 5-12 MPa, which correspond to maximum uniaxial strains of 3% to 10% for the range of material modulus used.

The presence of an initial edge crack 100 having an initial crack length a creates a stress intensity $K_I$. A crack growth (i.e., propagation) rate per stress cycle da/dN can be plotted relative to the stress intensity $K_I$ by testing multiple samples at different stress levels and the same initial crack length a, or by varying the initial crack length a. Initial crack lengths of 1-4 mm were appropriate for characterization of the material 45.

The stress intensity $K_I$ of the sample of FIG. 10, using geometry values provided above, is:

$$K_I = 1.126\sigma\sqrt{\pi a} \qquad (12)$$

where: $K_I$=stress intensity
a=crack length

It can be advantageous to express $K_I$ in terms of a strain energy release rate T:

$$T = \frac{K_I^2}{E} \qquad (13)$$

Thus, after substituting Equation (13) in Equation (12):

$$T = 1.25\frac{\sigma^2\pi a}{E} \qquad (14)$$

where: T=strain energy release rate

Using the experimental procedure described above, a given elastomer can be characterized for its relationship between the crack propagation rate da/dN and the strain energy release rate T. With knowledge of design values of $\sigma_{MAX}$, this may serve as an approximate value for the far-field stress applied to the material test samples. Different levels of the strain energy release rate T may be easily created by changing the initial crack length a. Any other suitable test method using any test specimen geometry may be used to characterize the relationship between the crack propagation rate da/dN and the strain energy release rate T in other embodiments.

In some embodiments, for efficient long-lasting operation of the non-pneumatic tire 34, the crack propagation rate da/dN of the elastomeric tire material 45 at the strain energy release rate T of 3 N-mm/mm$^2$, as measured using a sample of the tire material 45 according to the test method as discussed above, may be no more than (i.e., equal to or less than) 1e-4 mm/cycle, in some cases no more than 1e-5 mm/cycle, in some cases no more than 1e-6 mm/cycle, and in some cases even less. This would position the elastomeric tire material 45 so that it intersects a line Q in a chart shown in FIG. 11, which relates the crack propagation rate da/dN and the strain energy release rate T of the elastomeric tire material 45 on a log-log scale.

Also, in some embodiments, the modulus of elasticity E of the elastomeric tire material 45 having this level of tension fatigue performance may be at least 90 MPa, in some cases at least 130 MPa, in some cases at least 180 MPa, and in some cases even more.

In some examples of implementation, under extreme use or overload conditions, crack propagation rates at higher strain energy release rates may be more appropriate to specify. For example, in some embodiments, with T=6 N-mm/mm$^2$, a crack propagation rate of no more than 1e-3 mm/cycle, in some cases no more than 1e-4 mm/cycle, in some cases no more than 1e-5 mm/cycle, and in some cases even less may be used.

In some embodiments, a suitable elastomer for the elastomeric tire material 45 may be a thermoplastic elastomer, such as any elastomer among the family of polyether-ester block copolymers. This system combines attributes of moisture and microbe resistance from the polyether component and high fatigue capability from the polyester component. The high modulus of the elastomeric material may be achieved by choosing a lower molecular weight hard segment.

In some other embodiments, a suitable elastomer for the elastomeric tire material 45 may be a thermoset polyurethane elastomer. Several chemical attributes may be combined in order to achieve the desired high modulus and high crack propagation resistance. In some embodiments, these chemical attributes may include one or more of:

1. Low-Free methylene diphenyl diisocyanate (MDI) prepolymer—i.e., low percentage of unreacted MDI content—i.e., less than 5 wt % free MDI, in some cases less than 2 wt % free MDI;
2. High percentage of isocyanate (NCO)—i.e., 5.0 wt %, 6.0 wt % or higher NCO content;
3. Use of a diamine, heat-activated curing system, such as a complex of methylene diphenyl diamine (MDA) and NaCl, dispersed in dioctyl adipate;
4. A prepolymer designed with a range of multiple molecular weights, as opposed to a single molecular weight that would give the same modulus after reaction with a curative;
5. Prepolymers with backbones of ester, ether or polycaprolactone. Ether systems tend to have a lower glass transition temperature which contributes to modulus stability over the operating temperature range. Ether is also resistant to moisture and microbe degradation. For a given NCO content, an ether system generally exhibits a higher Young's modulus;
6. High stoichiometry (i.e., ratio of active curative groups in the curing system to NCO groups in the prepolymer) in the range to 97% to 102% theory; and
7. Post-cure treatment at a temperature greater than 105° C., such as at least 140° C., for 24 hours.

Any one or combination of the above chemical attributes may be present in some cases.

High NCO content can be used to obtain high modulus in polyurethane chemistries. However, high NCO content can also result in very short pot life, when used with conventional amine cures that begin reaction as soon as they are mixed together. A delayed action curing system that is triggered by a mold temperature may enable easier processing of high NCO content chemistries. Further, combining (1), (2) and (3) above may enable a very high quality hard segment of the polyurethane which provides temperature stability of this high modulus as well as high crack propagation resistance.

Using multiple molecular weights tends to give a high modulus polyurethane (low molecular weight) the crack resistance of a comparatively lower modulus polyurethane (high molecular weight). Ether prepolymers have the advantage of moisture and microbe resistance.

95% stoichiometry is a percentage that may be generally recommended for standard polyurethane use. However, higher stoichiometry mixes have a small percentage of unreacted curative, which may be beneficial for crack propagation resistance. Above about 102% theory, other properties may begin to degrade. In one embodiment, the range of stoichiometry may be between 97% and 102%.

Post cure at 105° C. for 24 hours is generally used in most conventional thermoset polyurethane systems, but an elevated higher temperature, such as 140° C., for 24 hours may enhance crack propagation resistance.

Combining (1) to (7) above has been shown to confer the elastomer a high modulus, high tensile crack propagation resistance suitable for use as the elastomeric tire material 45.

Figure 11:
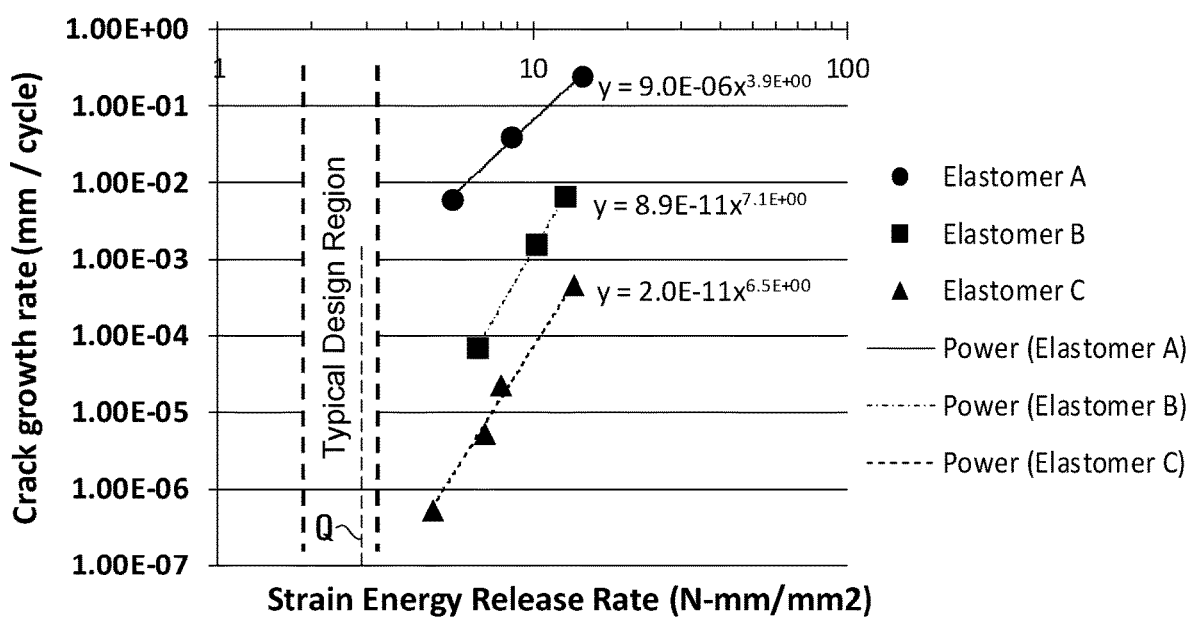
FIG. 11 shows a relation between a crack growth rate and a strain energy release rate for different thermoset elastomeric materials.

For example, test results for three candidate materials for the elastomeric tire material 45 are shown in FIG. 11. In this embodiment, these materials represent different cast, thermoset, high modulus polyurethanes. Plotted on the log-log scale, the relationship between the crack growth rate da/dN (Y-axis) and the strain energy release rate T (X-axis) is linear. This is surprising, yet follows trends reported in patent literature for metals such as steel and aluminum.

In this example, the three candidate polyurethanes are as follows:
  Elastomer A: Young's extension modulus=210 MPa. This is a tolylene diisocyanate (TDI) formulation, with an ether backbone, reacted with a diamine cure;
  Elastomer B: Young's extension modulus=210 MPa. This is a MDI formulation with an ether backbone, reacted with a heat-activated diamine cure and a NCO content of 7.0 wt %; and
  Elastomer C: Young's extension modulus=130 MPa. This is an MDI formulation with an ether backbone, reacted with a heat-activated diamine cure and a NCO content of 6.15 wt %.

The following observations may be made:
  Elastomer B is two to three orders of magnitude better than Elastomer A in terms of crack growth rate at a given value of strain energy release rate. At a design value for the strain energy release rate T of 3.0 N-mm/mm$^2$, Elastomer B's crack growth rate da/dN=2.2e-7 mm/cycle, whereas Elastomer A's crack growth rate da/dN=6.5e-3 mm/cycle. These values of da/dN may be obtained by extrapolating the curve fit parameters shown on FIG. 11. In the equations, "Y"=da/dN, and "X" is the design strain energy release rate;
  The advantage of Elastomer B over Elastomer A increases with decreasing strain energy release rate T. At very high levels of the strain energy release rate, such as 20 N-mm/mm$^2$, the two elastomers have similar performance. Yet, with a crack growth rate of 1 mm in a single cycle, this would essentially be a static type of failure. Tear strength resistance tests such as Die C and Split are designed for such static material characterization; and
  Elastomer C has a higher level of performance than Elastomer B, yet the lines are essentially parallel.

Elastomers A and B have the same modulus of 210 MPa, yet show extremely different levels of tension-induced crack propagation. These materials were also exposed to flex testing, such as is traditionally used for elastomer characterization, with the following results:

| Elastomer | Unnotched Demattia | Notched Demattia, 2 mm center notch, 20% surface strain |
|---|---|---|
| A | No visible degradation after 10^6 cycles | No crack propagation after 10^6 cycles |
| B | Same as A | Same as A |
| C | Same as A | Same as A |

After notched Demattia testing for 10^6 cycles, Elastomers A and C were then tested in the uniaxial tension fatigue test. A strain of 20% was used as input, to match the 20% surface strain that was attained in the Demattia test. Results were as follows:
  Elastomer A: cross section broke after 8 cycles; and
  Elastomer C: cross section broke after 21,000 cycles.

These results show that traditional flex fatigue tests such as Demattia are insufficient in finding separation of material capability in crack propagation, even when the surface strain of a flex test is matched to the tension strain of a tension test. As previously discussed, a physical reason for this relates to the difference in strain energy in a sample deformed in flexion vs. a sample deformed in tension. Due to the exponential relationship between da/dN, as shown in FIG. 11, reducing the strain energy release rate T by a factor of six (e.g., from 6 N-mm/mm$^2$ to 1 N-mm/mm$^2$) can reduce the crack growth rate da/dN by a factor of four orders of magnitude, or more.

Tension-based NPTs such as the non-pneumatic tire 34 were manufactured with Elastomers A and C. When tested in an overload condition, the non-pneumatic tire 34 made with Elastomer A failed after less than 100 km, whereas the non-pneumatic tire 34 made with Elastomer C did not fail even after 1000 km.

Accordingly, while Elastomer A appears to be a good choice as the tire material 45 from a standpoint of Tear Resistance (Die C (98 N/mm) and Split (12 N/mm), hysteresis (tan (delta)=0.11), tensile strength (46 MPa) and the above listed flex fatigue performances, Elastomer A did not perform well in the non-pneumatic tire 34. The development of uniaxial tension fatigue testing provided a discriminating test, which enabled the successful identification of other material options, such as Elastomers B and C.

Tension-based non-pneumatic tires comprising thermoset elastomers exist. For example, there is an existing other non-pneumatic tire for use as a rear wheel of a riding lawnmower, with dimension 24"×12"-12", and having an annular support similar in geometry to an embodiment of the non-pneumatic tire 34 shown in FIG. 7, whereby the annular support comprises a spoke structure that extends in a radial direction and connects a hub to an annular beam. Crack propagation performance of a spoke from this existing other tire was measured using techniques disclosed herein. The spoke material composition was also analyzed using laboratory techniques.

Figure 12:
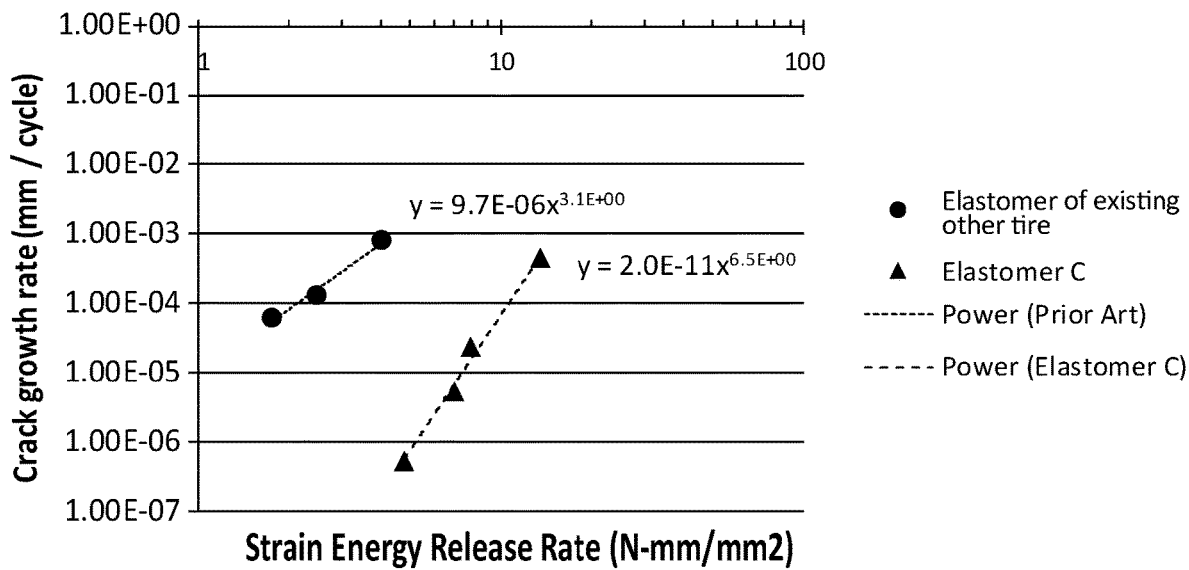
FIG. 12 shows a relation between a crack growth rate and a strain energy release rate for a prior thermoset elastomer and an example of a thermoset elastomer of the non-pneumatic tire in accordance with an embodiment.

FIG. 12 provides the performance of the elastomer of this existing other tire, and compares it to the performance previously noted for Elastomer C, which may be comprised in embodiments of the non-pneumatic tire 34. At a strain energy release rate of 3 N-mm/mm$^2$:
  Crack growth rate of elastomer of existing other tire=2.9E-04 mm/cycle
  Crack growth rate of Elastomer C=2.5E-08 mm/cycle Elastomer C thus attains a performance improvement of over 4 orders of magnitude, for tension-based stress induced crack propagation.

Material analysis also revealed that the elastomer of the existing other tire was a thermoset material of standard MDI formulation, with a conventional butanediol cure. For instance, in U.S. Pat. No. 7,201,194 which may relate to the existing other tire, specification of the web spoke material includes Vibrathane B836 of Crompton Corporation, now owned by Lanxess Inc. This material is a standard MDI polyester-based formulation with a butanediol cure. Thus, neither this prior patent nor the existing other tire employs elements previously described herein for optimizing tension-based crack propagation. The elastomer material of the existing other tire does not meet the material performance for certain embodiments of the non-pneumatic tire 34.

Using characterization procedures disclosed herein, the inventor also tested thermoplastic elastomers of different chemical composition. Testing revealed that the family of polyether-ester block copolymers may give high crack propagation resistance as well as high modulus. This system combines attributes of moisture and microbe resistance from the polyether component, and high fatigue capability from the polyester component. The high modulus can be enabled by choosing a lower molecular weight hard segment.

Further, the inventor used the disclosed testing methodology to further optimize thermoplastic elastomers for use as a non-pneumatic, tension-based tire material. Current fundamental research indicates that bioinspired structural materials may create opportunities for improved crack propagation resistance (e.g., see Bioinspired structural materials, Ulrike G. K. Wegst et. al., NMAT 4089, 26 Oct. 2014, which is incorporated by reference herein). Bioinspired elastomers may comprise additives with much higher stiffness than the neat, isotropic host elastomer. For example, carbon black molecules, aramid pulp, aramid floc, and/or aramid micropulp may be added in small volume fractions to a co-polymer elastomer. With appropriate thermoplastic processing, these additives may be finely dispersed in the final elastomer. This ability to finely disperse such additives is a virtue of thermoplastic processing as opposed to thermoset processing.

With carbon black, for example, using thermoplastic chemistry, a master batch may be made having a moderately large percentage of carbon black by volume—say, 25%. Then, this master batch may be mixed at the molding company using some let-down ratio, say, 10:1, with the primary elastomer. Thus, the volume percentage of carbon black in the final elastomer is 2.5%, which is evenly dispersed. Such procedures are well-known and often practiced, as carbon black has been shown to aid in weatherability and UV resistance, in addition to its use as a colorant.

Similar procedures can be employed for composing elastomers comprising aramid fibers that are evenly dispersed. Aramid fibers may be processed as floc, pulp, or micro-pulp (e.g., see DuPont Kevlar fiber. Part 3. Hybrid cords, short fibers, and their application in composites with thermoplastics and thermosetting plastics. Plasticheskie Massy, N. 12, 2009, pp. 7-10, which is hereby incorporated by reference herein).

These fibers and/or carbon black molecules create obstacles for crack propagation in a tensile field. A crack is inhibited from growing in a straight line, and must circumvent the added materials which are of much higher modulus. By consequence, the strain energy release required to grow a crack tip may be increased.

By extensive testing, the inventor has found combinations of carbon black and Kevlar additives that improve tensile-driven crack propagation, compared to a very high performance isotropic thermoplastic copolymer. This is shown in FIG. 13.

Figure 13:
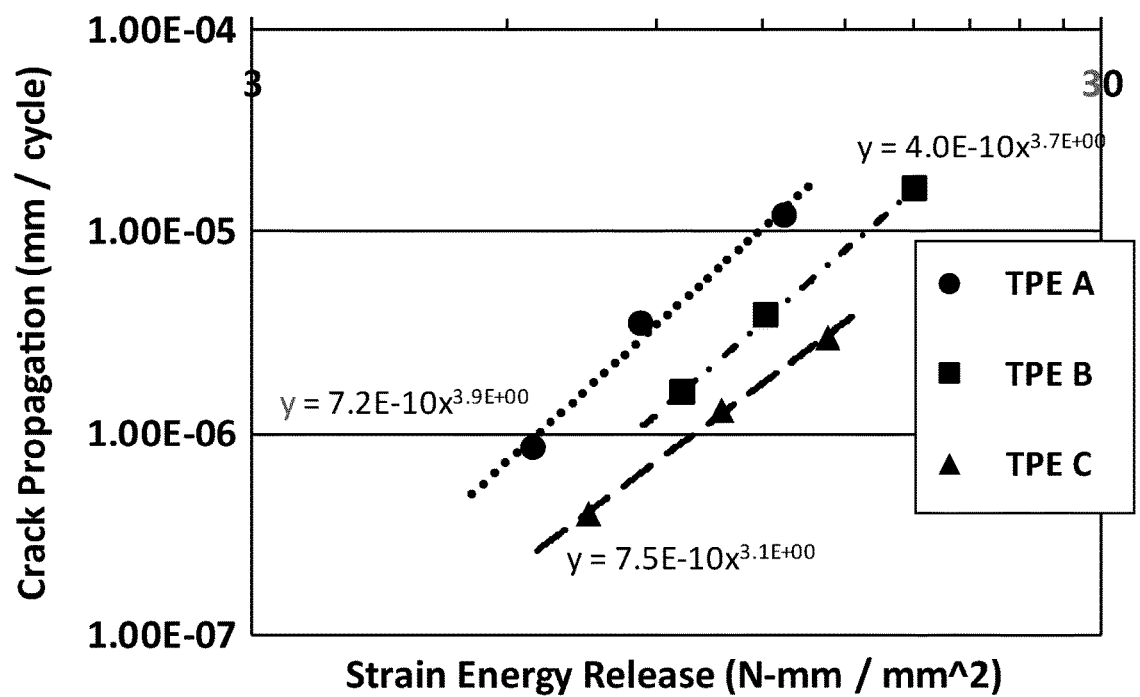
FIG. 13 shows a relation between a crack growth rate and a strain energy release rate for different thermoplastic elastomeric materials.

In FIG. 13:
  TPE A=high performance isotropic thermoplastic copolymer
  TPE B=TPE A, with small percentage (e.g., 2% to 10% by weight) of carbon black additive
  TPE C=TPE B, with small percentage (e.g., 0.5% to 2% by weight) Kelvar floc additive Crack propagation rates for the above elastomers are given below, for two levels of strain energy release rate:

|       | T = 3 N-mm/mm$^2$ | T = 6 N-mm/mm$^2$ |
|-------|-------------------|-------------------|
| TPE A | 5.2E−08 mm/cycle  | 7.8E−07 mm/cycle  |
| TPE B | 2.3E−08           | 3.0E−07           |
| TPE C | 2.2E−08           | 1.9E−07           |

While already at a high level of performance, TPE A can be moderately improved by the addition of carbon black and Kevlar floc. Furthermore, the benefits may be cumulative.

Such low values of crack propagation rate may be useful to reach adequate performance for certain applications. For example, a 0.61 meter (24") outer diameter tire for use on a lawn mower has a circumference of 1.91 meters. A 20,000 km service life results in 1.05E07 tire rotations, or cycles. Therefore, a crack propagation rate on the order of 1.0E-6 mm/cycle, or lower, may be required to guarantee the desired service life, even when the mower is operated in hostile environments containing branches, rocks, and other debris that can cut the annular beam and/or spokes.

In some examples where the annular beam 36 is unreinforced as discussed above, the non-pneumatic tire 34 may have the modulus of elasticity of the tire material 45 E=130 MPa and the stress $\sigma_{MAX}$=130 MPa and exhibit an approximate strain $\varepsilon$=0.05 which corresponds to a material that is not inextensible. Accordingly, the shear strain developed between the outer band 31 and the inner band 33 does not follow Equation (2) above. The shear strain $\gamma(x)$ does not increase linearly as the length $L_C$ of the contact patch 25 increases because the outer band 31 and the inner band 33 strain. This in turn relieves and reduces the shear strain in the shear beam 39.

Since $\gamma(x)$ does not increase linearly with the length $L_C$ of the contact patch 25, the total force carried in the inner band 33 does not follow Equation (4). In light of the character of the crack propagation rate da/dN with the strain energy release rate T, this may be considered a positive design attribute in some embodiments.

Through finite-element modeling optimization and physical experimentation, an interaction between two design attributes, namely extensibility and tensile crack propagation measurements, is now discussed.

Figure 14:
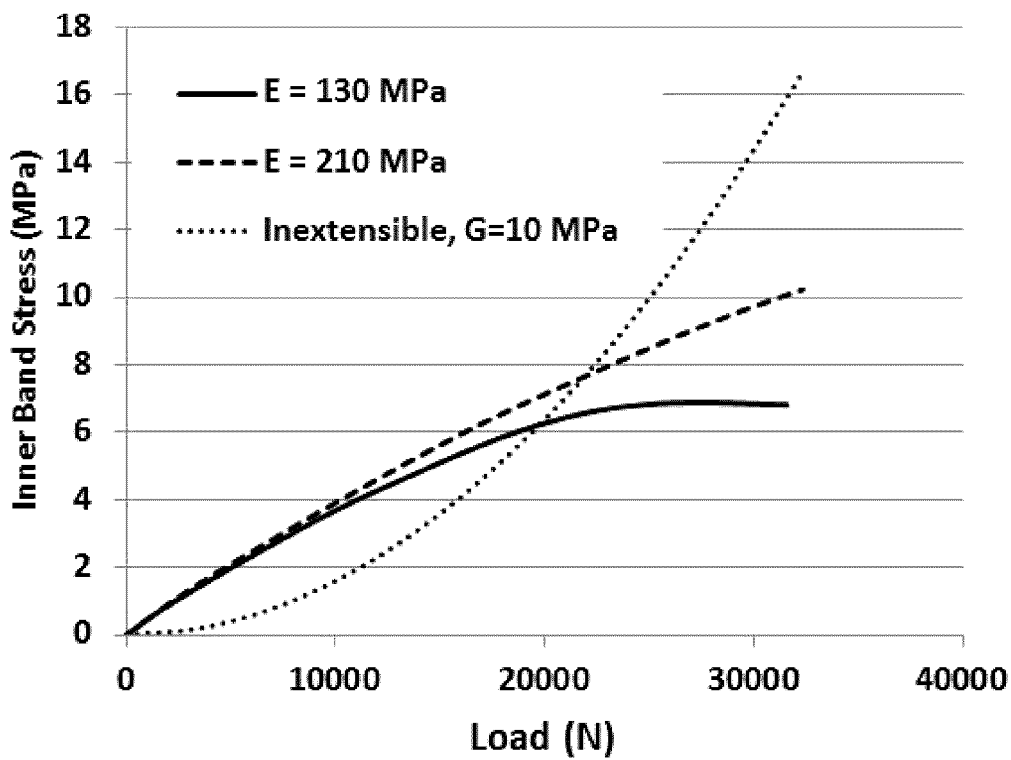
FIG. 14 shows maximum principle stress as a function of tire load in the annular beam of FIG. 5B for two different levels of modulus of elasticity of elastomeric material of the annular beam.

With reference to FIG. 14. there is shown the $\sigma_{MAX}$ variation at the inner band 33 of the annular beam 36 with the load $F_Z$ for the finite-element model of FIG. 5A, where the annular beam 36 and the spoked support 41 have a modulus of either E=130 MPa or E=210 MPa. These moduli correspond to Elastomers C and B above, respectively. The thickness of the inner band 33 is $t_{BAND}$=10 mm.

For both E=130 MPa and E=210 MPa, $\sigma_{MAX}$ increases with load, but the curves are concave down. As load increases, $\sigma_{MAX}$ increases with a slower rate.

As the compliance of the annular beam 36 increases, i.e., with E=130 MPa compared to E=210 MPa, this effect becomes more favorable. In fact, for the case of E=130 MPa, $\sigma_{MAX}$ reaches a maximum of 6.8 MPa at FZ=24000 N. Further increase of $F_Z$ does not increase $\sigma_{MAX}$.

An annular beam design according to FIG. 8 can give similar operating characteristics as embodiments of the non-pneumatic tire 34 considered above, provided G=5 MPa and h=40 mm, with $R_{BEAM}$=400 mm.

FIG. 14 shows the inner band $\sigma_{MAX}$ for this case of inextensibility. For direct stress comparison with other results, the inner band cross section areas are assumed identical. Perfect inextensibility of outer and inner bands creates a perfect "shear beam" in which there is no deflection due to bending—all deflection occurs in shear. As such, no inner and outer fiber stresses occur due to bending. Therefore, at low loads having a small length $L_C$ of the contact patch 25, a non-pneumatic tire having inextensible reinforcements will develop lower band stresses than a non-pneumatic tire with extensible bands. Extensibility enables some deflection by bending. However, as the length $L_C$ of the contact patch 25 increases, the exponential character of Equation (4) dominates, and the band of the tire with inextensible reinforcement develops higher stress than the non-pneumatic tire without reinforcement.

In the specific embodiment of a 12.00-16.5" skidsteer tire, a working load may be around 20000 N (2000 kg). At this working load, a maximum stress of between 6 to 7.5 MPa is found in the case of E=130 MPa, E=210 MPa and inextensibility. However, overloading past this working load yields very different results. At 30000 N, the case of E=130 MPa gives $\sigma_{MAX}$=6.3 MPa, E=210 MPa gives $\sigma_{MAX}$=9.5 MPa, and inextensibility gives $\sigma_{MAX}$=14 MPa.

With reference to FIG. 11, and taking elastomer B as an example, a strain energy release rate of 6 N-mm/mm2 gives a da/dN=1e-4 mm/cycle. Increasing the strain energy release rate by 50%, to 9 N-mm/mm2 gives da/dN=1e-3, producing a 10-fold increase. This would give 10× lower fatigue life. This is the magnitude of change between the case of E=210 MPa and inextensibility.

Figure 15:
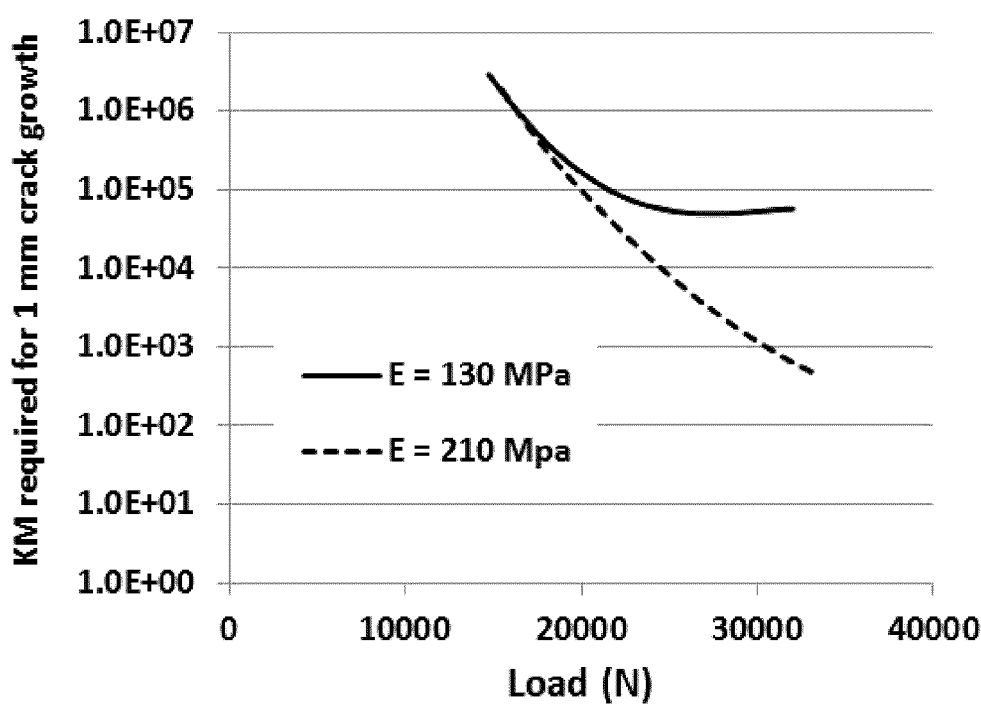
FIG. 15 shows a number of kilometers necessary for 1-mm crack growth as a function of load in the annular beam of FIG. 5B for two different levels of the modulus of elasticity of the elastomeric material of the annular beam.

Using the measured da/dN vs. T of FIG. 11 for Elastomers B and C, the number of kilometers required to propagate an initial 3 mm crack to a 4 mm crack can be calculated by using with the finite-element model results of FIG. 14 for the two cases of E=130 MPa and E=210 MPa. The results are shown in FIG. 15. The increased stiffness with E=210 MPa results in greater stress at high loads. This results in higher strain energy release rates at higher loads; in addition, the measured da/dN of Elastomer B is higher (worse) than that of Elastomer C. Thus, the higher modulus of Elastomer B gives worse performance than that of Elastomer C in overload conditions. Hence, extensibility may be a positive design attribute, provided the required vertical stiffness of the tire can be obtained. This may place a lower limit on the modulus of the material 45.

Higher modulus materials—even if da/dN vs. T could be kept the same as Elastomer B—could have even worse performance, because $\sigma_{MAX}$ would increase more with load.

The thickness $t_{BAND}$ of the inner band 33 of the annular beam 36 can be used in conjunction with the modulus of elasticity $E_{BAND}$ to control $\sigma_{MAX}$. $t_{BAND}$ can be generally expressed as a percentage of the radius $R_{BEAM}$ of the annular beam 36. Through finite-element modeling analysis and experimentation, in some embodiments, ranges may be as follows:

$$0.02 < \frac{t_{BAND}}{R_{BEAM}} < 0.035$$

$$90 \text{ MPa} < E_{BAND} < 210 \text{ MPa}$$

$$1.8 \text{ MPa} < EA_{BAND} < 7 \text{ MPa}$$

where:

$$EA_{BAND} = \frac{E_{BAND} t_{BAND}}{R_{BEAM}}$$

When these design values are combined with the earlier specifications of da/dN vs. strain energy release rate, a highly performant tension-based non-pneumatic tire can be designed that does not comprise inextensible reinforcement in the annular beam 36.

In some embodiments, principles discussed herein to enhance crack propagation resistance for the tire material 45 may be applied to one or more selected parts of the non-pneumatic tire 34, such as the annular beam 36 or the spoked support 41. For example, in some embodiments, the tire material 45 with enhanced crack propagation resistance may be a thermoplastic that only makes up the annular beam 36, not the spoked support 41, which may be made of another elastomeric material. Similarly, in other embodiments, the tire material 45 with enhanced crack propagation resistance may be a thermoset that only makes up the annular beam 36, not the spoked support 41, which may be made of another elastomeric material.

This may relate to optimal processing for differently-sized tires with different performance requirements. For example, it may be convenient to construct the annular beam 36 using a process amenable to thermoset materials. The annular beam 36 may be of a size and weight that are impractical for a thermoplastic process. The spoked support 41 may be adhered or affixed to the annular beam 36 in a secondary process. The spoked support 41 may be a thermoplastic material. Each spoke could be separately constructed and affixed to the annular beam 36 via mechanical and/or chemical means, thereby imparting a modular element of construction to the complete tire 34.

Elastomeric materials contemplated herein for various embodiments are processed using any suitable means, including thermoplastic injection, hot open casting, spin casting, and reaction-injection molding. However, there exists a class of materials which are essentially chemically indistinguishable, yet can be processed using thermoplastic or thermoset methods. For example, a standard polyurethane MDI ether prepolymer, with a butanediol curative may be formulated with a very high stoichiometry of 102%, or higher. The excess, unreacted curative in the resulting elastomer acts like a soft segment in a thermoplastic elastomer. The elastomer, then, behaves like a thermoplastic. Using almost identical chemistry, these constituents may be pelletized and processed using thermoplastic methods. This class of polymer is encompassed by embodiments of the tension-based non-pneumatic tire 34 contemplated herein, when having high tension-based crack propagation resistance as defined herein.

While in embodiments considered above the wheel $20_i$ is part of the construction vehicle 10, a wheel constructed according to principles discussed herein may be used as part of other vehicles or other devices in other embodiments.

Figure 16:
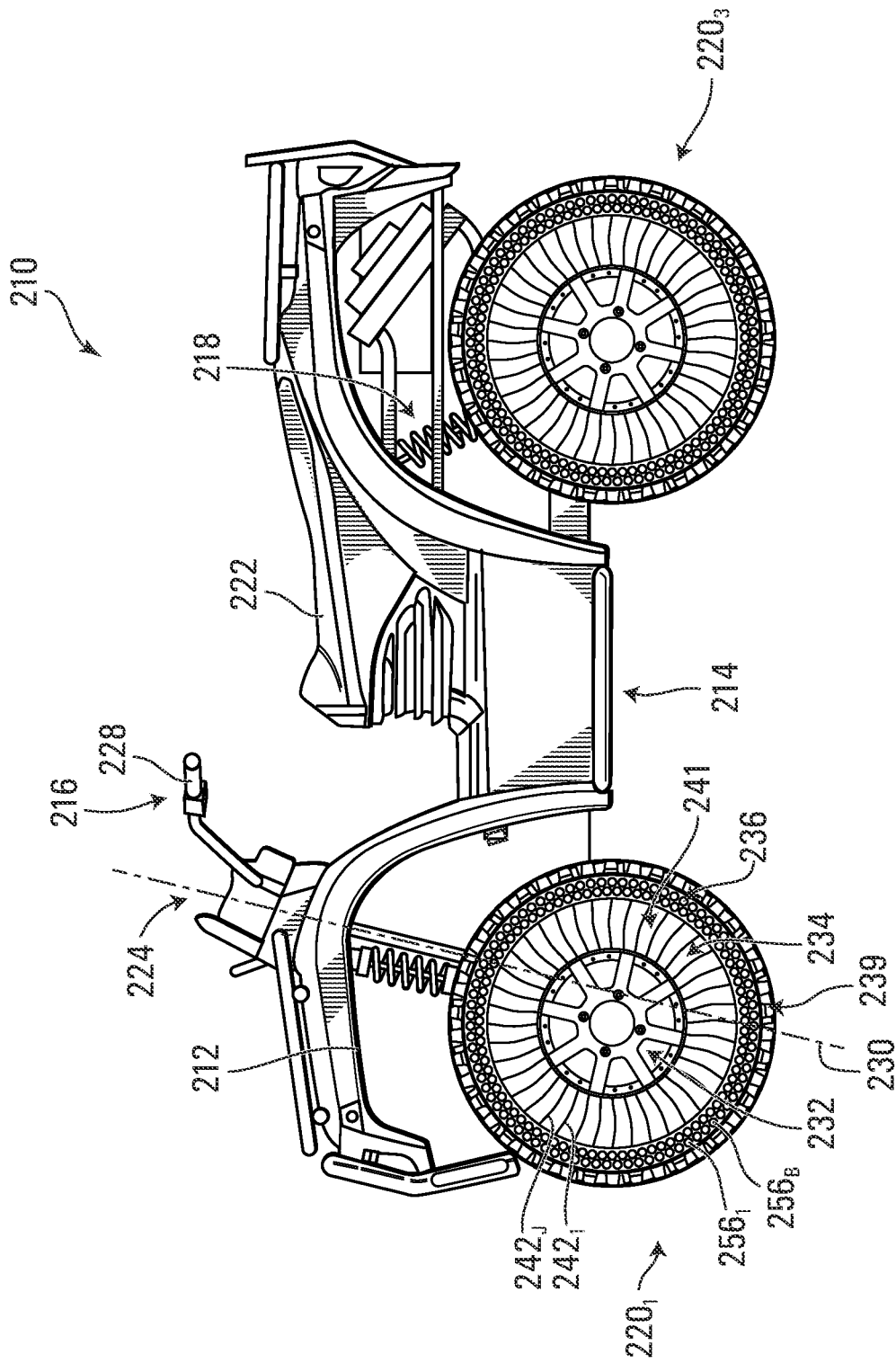
FIGS. 16 and 17 show an example of another vehicle comprising wheels comprising non-pneumatic tires in accordance with another embodiment.
Figure 17:
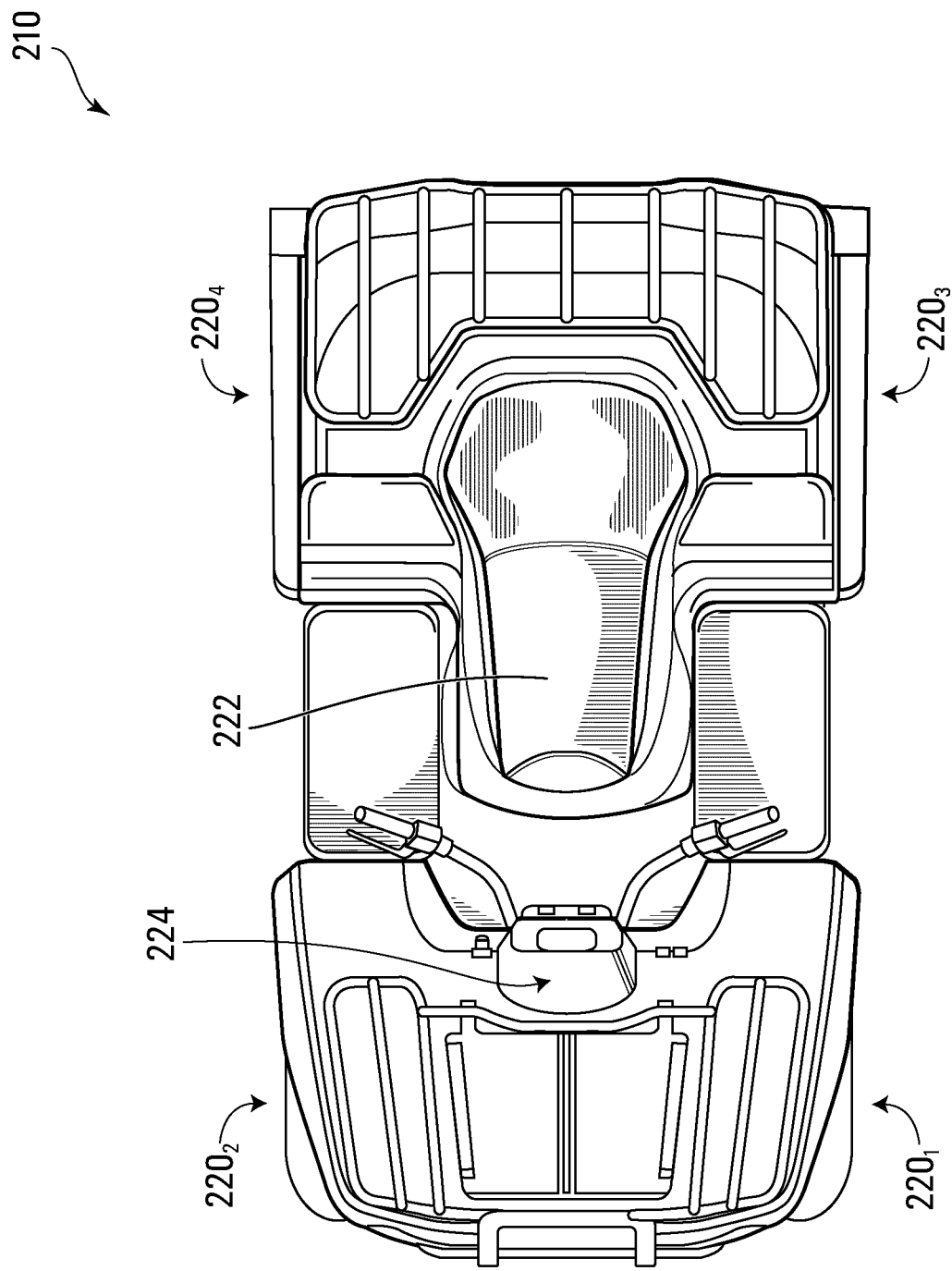

For example, with additional reference to FIGS. 16 and 17, in some embodiments, an all-terrain vehicle (ATV) 210 may comprise wheels $220_1$-$220_4$ constructed according to principles discussed herein in respect of the wheel $20_i$. The ATV 210 is a small open vehicle designed to travel off-road on a variety of terrains, including roadless rugged terrain, for recreational, utility and/or other purposes. In this example, the ATV 210 comprises a frame 212, a powertrain 214, a steering system 216, a suspension 218, the wheels $220_1$-$220_4$, a seat 222, and a user interface 224, which enable a user of the ATV 210 to ride the ATV 210 on the ground.

The steering system 216 is configured to enable the user to steer the ATV 210 on the ground. To that end, the steering system 216 comprises a steering device 228 that is operable by the user to direct the ATV 210 along a desired course on the ground. In this embodiment, the steering device 228 comprises handlebars. The steering device 228 may comprise a steering wheel or any other steering component that can be operated by the user to steer the ATV 210 in other embodiments. The steering system 216 responds to the user interacting with the steering device 228 by turning respective ones of the wheels $220_1$-$220_4$ to change their orientation relative to the frame 212 of the ATV 210 in order to cause the ATV 210 to move in a desired direction. In this example, front ones of the wheels $220_1$-$220_4$ are turnable in response to input of the user at the steering device 228 to change their orientation relative to the frame 212 of the ATV 210 in order to steer the ATV 210 on the ground. More particularly, in this example, each of the front ones of the wheels $220_1$-$220_4$ is pivotable about a steering axis 230 of the ATV 210 in response to input of the user at the steering device 228 in order to steer the ATV 210 on the ground. Rear ones of the wheels $220_1$-$220_4$ are not turned relative to the frame 212 of the ATV 210 by the steering system 216.

In this embodiment, the seat 222 is a straddle seat and the ATV 210 is usable by a single person such that the seat 222 accommodates only that person driving the ATV 210. In other embodiments, the seat 222 may be another type of seat, and/or the ATV 210 may be usable by two individuals, namely one person driving the ATV 210 and a passenger, such that the seat 222 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "utility task vehicle" (UTV).

The wheels $220_1$-$220_4$ engage the ground to provide traction to the ATV 210. More particularly, in this example, the front ones of the wheels $220_1$-$220_4$ provide front traction to the ATV 10 while the rear ones of the wheels $220_1$-$220_4$ provide rear traction to the ATV 10.

Each wheel $220_1$ of the ATV 210 may be constructed according to principles described herein in respect of the wheels $20_1$-$20_4$, notably by comprising a non-pneumatic tire 234 and a hub 232 that may be constructed according to principles described herein in respect of the non-pneumatic tire 34 and the hub 32. The non-pneumatic tire 234 comprises an annular beam 236 and an annular support 241 that may be constructed according principles described herein in respect of the annular beam 36 and the annular support 41. For instance, the annular beam 236 comprises a shear beam 239 comprising openings $256_1$-$256_B$ and the annular support 241 comprises spokes $242_1$-$242_J$ that may be constructed according to principles described herein in respect of the shear beam 39 and the spokes $42_1$-$42_T$.

Figure 18:
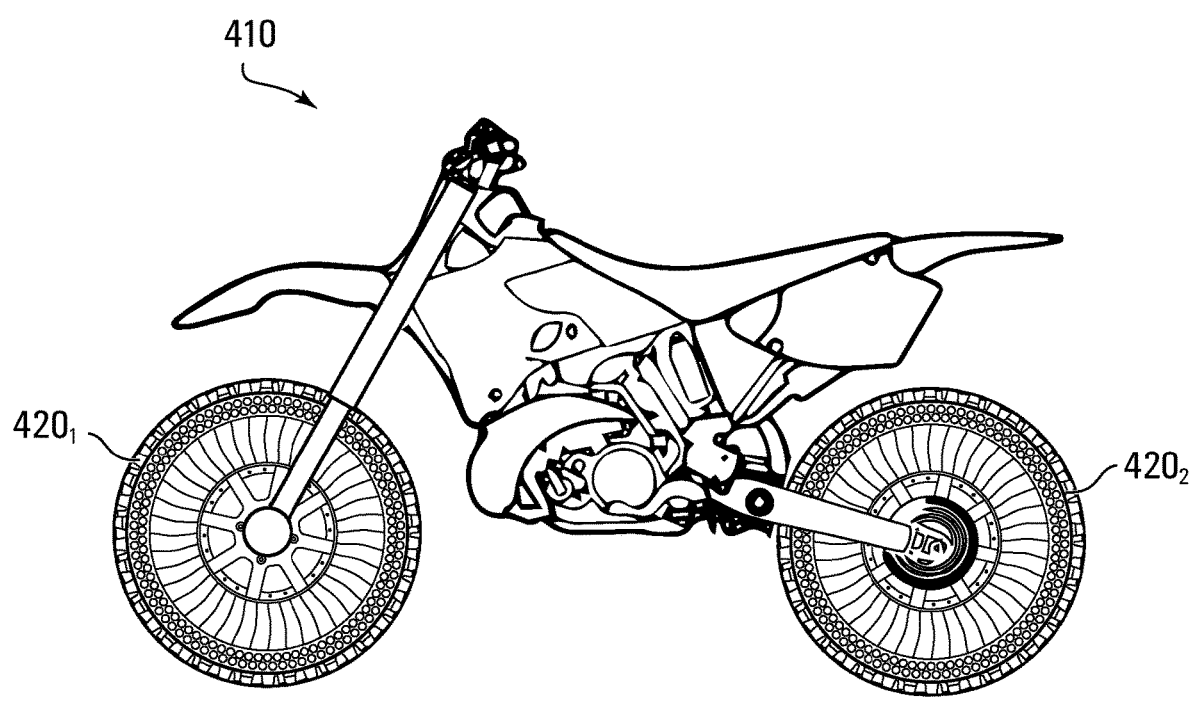
FIG. 18 shows an example of another vehicle comprising wheels comprising non-pneumatic tires in accordance with another embodiment.

As another example, in some embodiments, with additional reference to FIG. 18, a motorcycle 410 may comprise a front wheel $420_1$ and a rear wheel $420_2$ constructed according to principles discussed herein in respect of the wheel $20_i$.

As another example, in some embodiments, a wheel constructed according to principles discussed herein in respect of the wheel $20_i$ may be used as part of an agricultural vehicle (e.g., a tractor, a harvester, etc.), a material-handling vehicle, a forestry vehicle, or a military vehicle.

As another example, in some embodiments, a wheel constructed according to principles discussed herein in respect of the wheel $20_i$ may be used as part of a road vehicle such as an automobile or a truck.

Figure 19:
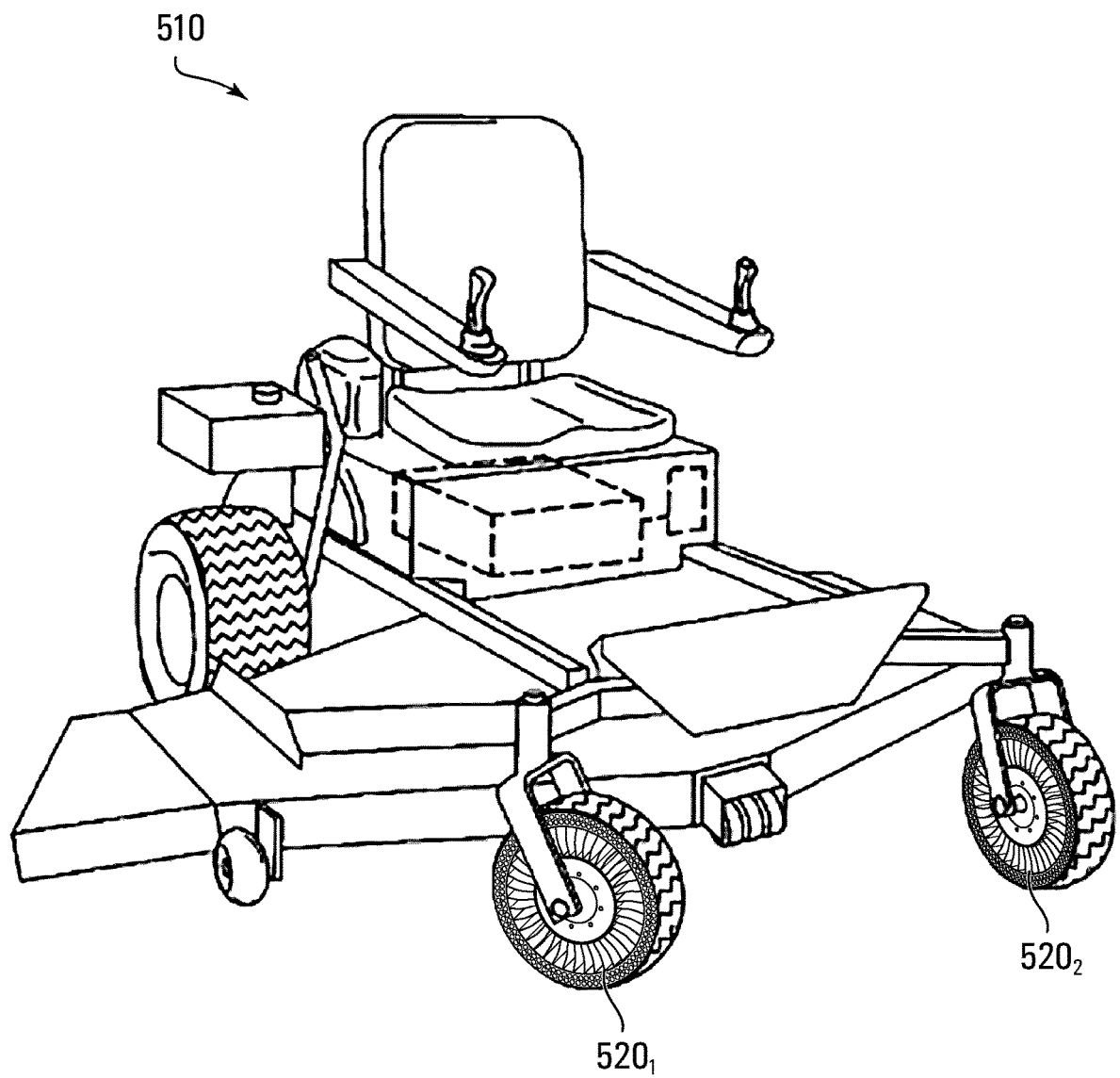
FIG. 19 shows an example of yet another vehicle comprising caster wheels comprising non-pneumatic tires in accordance with another embodiment.

As another example, in some embodiments, as shown in FIG. 19, a wheel constructed according to principles discussed herein in respect of the wheel $20_i$ may be used as part of a lawnmower 510 (e.g., a riding lawnmower, such as a zero-turning-radius (ZTR) mower) comprising caster wheels $520_1$, $520_2$.

Wheels constructed according to principles discussed herein in respect of the wheel $20_i$ may be implemented in any suitable size. For example, in addition to those mentioned above, the inventor has developed and reduced to practice other specific non-pneumatic tire sizes according to various embodiments. For instance, one tire dimension that has been reduced to practice is $D_T$=24.3", $W_T$=11.0", and $D_{TI}$=12.0", which corresponds to a tire often used in the lawn and garden industry as the rear tire for a riding lawnmower such as that discussed above. Another tire dimension that has been reduced to practice is $D_T$=26.5", $W_T$=10.0", and $D_{TI}$=12.0", which corresponds to a tire often used in the powersports industry as a tire for an all-terrain vehicle such as that discussed above. Another tire dimension that has been developed is $D_T$=43.5", $W_T$=16.5", and $D_{TI}$=19.0", which corresponds to a tire often used in the construction industry for telehandler and compact front end loader vehicles.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but not should not be limiting. Various modifications and enhancements will become apparent to those of ordinary skill in the art.

The invention claimed is:

1. A non-pneumatic tire comprising:
    an annular beam that is elastomeric and configured to deflect at a contact patch of the non-pneumatic tire as the non-pneumatic tire rolls on a ground surface; and
    an annular support that is elastomeric, extends radially inwardly from the annular beam and is configured to deform such that, when the non-pneumatic tire is loaded, an upper portion of the annular support above an axis of rotation of the non-pneumatic tire is in tension;
    wherein a crack propagation rate of a thermoset elastomeric material of at least one of the annular beam and the annular support is no more than 1e-4 mm/cycle at a strain energy release rate of 3 N-mm/mm².

2. The non-pneumatic tire of claim 1, wherein the crack propagation rate of the thermoset elastomeric material is no more than 1e-5 mm/cycle at the strain energy release rate of 3 N-mm/mm².

3. The non-pneumatic tire of claim 1, wherein the crack propagation rate of the thermoset elastomeric material is no more than 1e-5 mm/cycle at the strain energy release rate of 6 N-mm/mm².

4. The non-pneumatic tire of claim 1, wherein a modulus of elasticity of the thermoset elastomeric material is at least 90 MPa.

5. The non-pneumatic tire of claim 1, wherein a modulus of elasticity of the thermoset elastomeric material is at least 130 MPa.

6. The non-pneumatic tire of claim 1, wherein the annular beam comprises an outer annular portion, an inner annular portion, and a shearing annular portion between the outer annular portion and the inner annular portion that are elastomeric and configured to cause the annular beam to deflect more by shearing than by bending at the contact patch of the non-pneumatic tire.

7. The non-pneumatic tire of claim 6, wherein the shearing annular portion comprises a plurality of voids distributed in a circumferential direction of the non-pneumatic tire.

8. The non-pneumatic tire of claim 6, wherein a given one of the outer annular portion and the inner annular portion is free of substantially inextensible reinforcement running in a circumferential direction of the non-pneumatic tire.

9. The non-pneumatic tire of claim 8, wherein: the given one of the outer annular portion and the inner annular portion is the outer annular portion; and the inner annular portion is free of substantially inextensible reinforcement running in the circumferential direction of the non-pneumatic tire.

10. The non-pneumatic tire of claim 6, wherein the annular beam is free of substantially inextensible reinforcement running in a circumferential direction of the non-pneumatic tire.

11. The non-pneumatic tire of claim 1, wherein the annular support comprises a plurality of spokes, and each of the spokes extends freely from the annular beam towards a hub.

12. The non-pneumatic tire of claim 11, wherein a free span length of each of the spokes is at least 15% of an outer diameter of the non-pneumatic tire.

13. The non-pneumatic tire of claim 11, wherein a free span length of each of the spokes is at least 20% of an outer diameter of the non-pneumatic tire.

14. The non-pneumatic tire of claim 1, wherein the annular beam comprises at least part of the thermoset elastomeric material.

15. The non-pneumatic tire of claim 14, wherein the annular beam is entirely made of the thermoset elastomeric material.

16. The non-pneumatic tire of claim 1, wherein the annular support comprises at least part of the thermoset elastomeric material.

17. The non-pneumatic tire of claim 16, wherein the annular support is entirely made of the thermoset elastomeric material.

18. The non-pneumatic tire of claim 1, wherein each of the annular beam and the annular support comprises at least part of the thermoset elastomeric material.

19. The non-pneumatic tire of claim 18, wherein each of the annular beam and the annular support is entirely made of the thermoset elastomeric material.

20. The non-pneumatic tire of claim 1, wherein the thermoset elastomeric material is a first elastomeric material, and the non-pneumatic tire comprises a tread disposed radially outward of the annular beam and comprising a second elastomeric material different from the first elastomeric material.

21. A vehicle comprising the non-pneumatic tire of claim 1.

22. A non-pneumatic tire comprising:
an annular beam that is elastomeric and configured to deflect at a contact patch of the non-pneumatic tire as the non-pneumatic tire rolls on a ground surface;
an annular support that is elastomeric, extends radially inwardly from the annular beam and is configured to deform such that, when the non-pneumatic tire is loaded, an upper portion of the annular support above an axis of rotation of the non-pneumatic tire is in tension, the annular support comprising a plurality of spokes, each of the spokes extending freely from the annular beam towards a hub, a free span length of each of the spokes being at least 15% of an outer diameter of the non-pneumatic tire; and
a tread that is elastomeric and disposed radially outward from the annular beam;
wherein: a crack propagation rate of a thermoset elastomeric material of at least one of the annular beam and the annular support is no more than 1e-4 mm/cycle at a strain energy release rate of 3 N-mm/mm$^2$; and an elastomeric material of the tread is different from the thermoset elastomeric material of at least one of the annular beam and the annular support.

23. The non-pneumatic tire of claim 22, wherein the crack propagation rate of the thermoset elastomeric material of at least one of the annular beam and the annular support is no more than 1e-5 mm/cycle at the strain energy release rate of 3 N-mm/mm$^2$.

24. The non-pneumatic tire of claim 22, wherein the crack propagation rate of the thermoset elastomeric material of at least one of the annular beam and the annular support is no more than 1e-5 mm/cycle at the strain energy release rate of 6 N-mm/mm$^2$.

25. The non-pneumatic tire of claim 22, wherein a modulus of elasticity of the thermoset elastomeric material of at least one of the annular beam and the annular support is at least 90 MPa.

26. The non-pneumatic tire of claim 22, wherein the thermoset elastomeric material of at least one of the annular beam and the annular support comprises a low free MDI prepolymer and comprises a curing system comprising diamine (MDA) and NaCl.

\* \* \* \* \*